United States Patent
Iyer et al.

(10) Patent No.: US 12,380,495 B2
(45) Date of Patent: Aug. 5, 2025

(54) PLATFORM AGNOSTIC FINANCIAL GATEWAY SYSTEM AND METHOD FOR MANAGING FINANCIAL TRANSACTIONS

(71) Applicant: iCreditWorks, Iselin, NJ (US)

(72) Inventors: Shankar R Iyer, East Windsor, NJ (US); Suresh G Nair, Robbinsville Township, NJ (US); Vimalnath Umapathi, Brooklyn, NY (US); Amol Gote, Plainsboro, NJ (US); Maria Dominique, Kendall Park, NJ (US); Dheeraj Palakurthy, Waxhaw, NC (US)

(73) Assignee: iCreditWorks, Iselin, NJ (US)

( * ) Notice: Subject to any disclaimer, the term of this patent is extended or adjusted under 35 U.S.C. 154(b) by 163 days.

(21) Appl. No.: 18/169,244

(22) Filed: Feb. 15, 2023

(65) Prior Publication Data
US 2024/0273483 A1 Aug. 15, 2024

(51) Int. Cl.
| | |
|---|---|
| *G06Q 20/38* | (2012.01) |
| *G06Q 20/02* | (2012.01) |
| *G06Q 20/32* | (2012.01) |
| *G06Q 20/40* | (2012.01) |
| *G06Q 40/03* | (2023.01) |
| *G06Q 40/02* | (2023.01) |

(52) U.S. Cl.
CPC ........... *G06Q 40/03* (2023.01); *G06Q 20/027* (2013.01); *G06Q 20/322* (2013.01); *G06Q 20/4014* (2013.01); *G06Q 40/02* (2013.01)

(58) Field of Classification Search
CPC ............. G06Q 20/027; G06Q 20/3829; G06Q 20/4014; G06Q 2220/00
USPC .......................................................... 705/71
See application file for complete search history.

(56) References Cited

U.S. PATENT DOCUMENTS

| | | | |
|---|---|---|---|
| 2013/0210472 A1* | 8/2013 | Yan | H04W 4/14 455/466 |
| 2018/0183740 A1* | 6/2018 | Werdell | H04W 4/14 |
| 2021/0014231 A1* | 1/2021 | Durbin | H04W 12/088 |
| 2022/0138337 A1* | 5/2022 | Wilhelm | G06Q 30/0185 726/1 |
| 2022/0343300 A1* | 10/2022 | Armstrong | G06Q 20/10 |

(Continued)

*Primary Examiner* — John W Hayes
*Assistant Examiner* — Wodajo Getachew
(74) *Attorney, Agent, or Firm* — Jason C. Cameron

(57) ABSTRACT

A platform agnostic financial gateway system and method for managing financial transactions is disclosed. The method includes receiving an onboarding request by a one or more client platforms comprising one or more assets. The method includes processing the received onboarding request to integrate the one or more client platforms with the platform agnostic financial gateway system and determining profile data and configuration data of the one or more client platforms. The method further includes identifying platform-based services based on the profile data and configuration data and determining one or more capabilities of the one or more client platforms to interact with the platform agnostic financial gateway system. The method includes generating and rendering a dynamic screen on a user interface of the one or more client platforms for enabling one or more customers to select, process and manage one or more platform-based services through a one or more payment options.

22 Claims, 15 Drawing Sheets

(56) References Cited

U.S. PATENT DOCUMENTS

| | | | |
|---|---|---|---|
| 2023/0214805 A1* | 7/2023 | Kumar | G06Q 20/409 |
| | | | 705/406 |
| 2023/0394593 A1* | 12/2023 | Mahna | G06Q 30/04 |

* cited by examiner

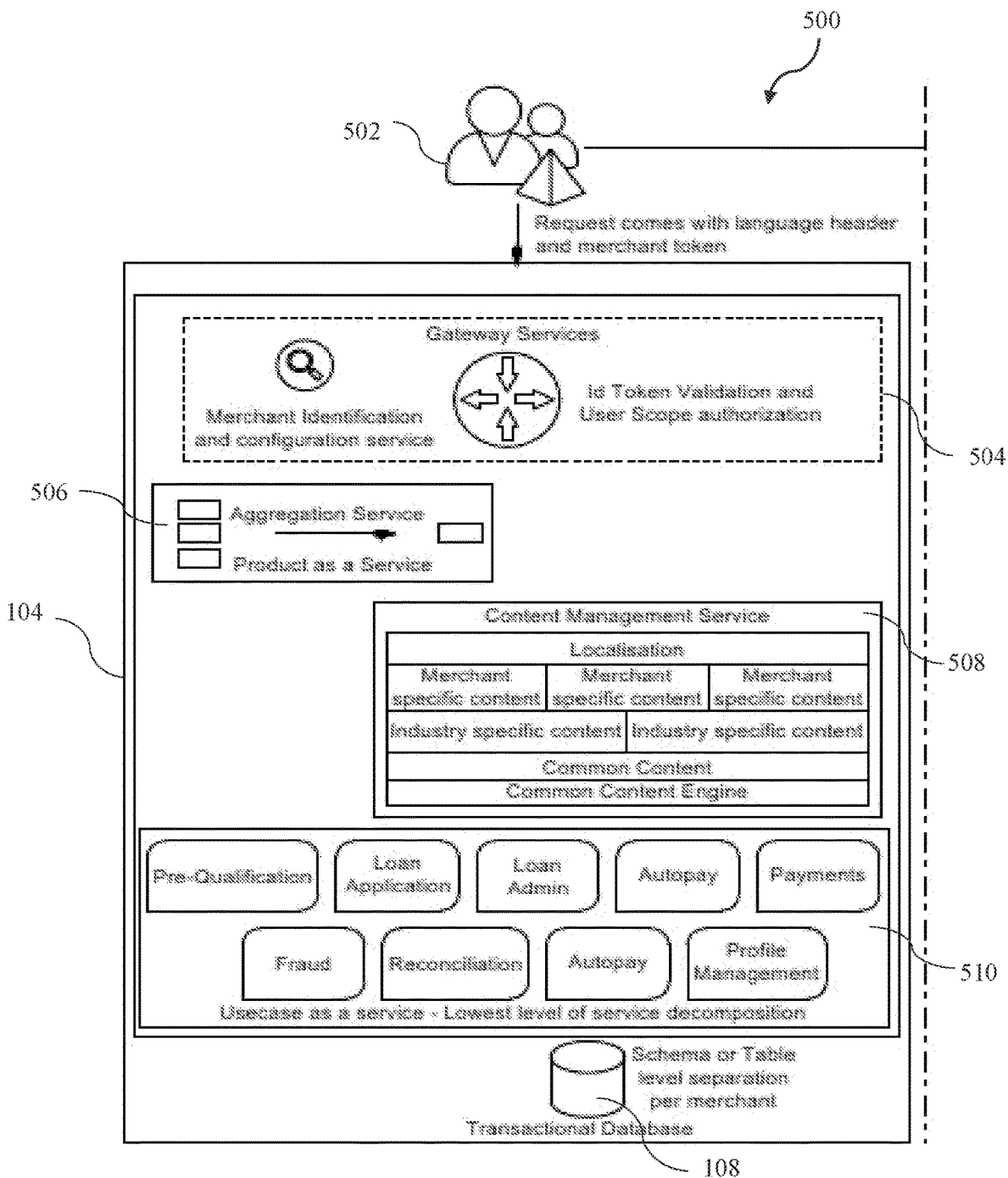
FIG. 5 (contd.)

612　　　　　　　614　　　　　　　　　　　　　　　　　616　　　 600

Patek Philippe
Third-Series Reference 3940J, a yellow gold perpetual calendar automatic watch, Circa 2002
◊ Complimentary Shipping within United States

| Price | 59,995 USD |
|---|---|

Purchase Now & Pay Later with Merchant 1
Monthly payments as low as $1,249.90 mo.*
with a 48-month term.

Pre-qualify now with Merchant 1
Checking your options won't affect your credit score. ⓘ
Add to Bag Details
Description
Reference 3940 has exploded in popularity over the recent years as collectors have come to appreciate the importance and beauty of it. Made over three series from 1987 to 2007, the watch is considered a grail watch by many.
This example is from the third series and was manufactured in 2002. It features a German-style dial with the day of the week and month in German. Offered in excellent condition.
Condition Report
　　O —— O —— O —— ☆ —— O
　Revive　Fair　Good　Very Good　Like New
Watch is in excellent overall condition with only few light signs of wear to the case.
Case has been very lightly polished in the past.
Dial is in excellent condition.
There are a few slight blemishes to the crystal.
Movement is running at time of cataloguing; however, it was not tested for the accuracy of time or duration of the

FIG. 6

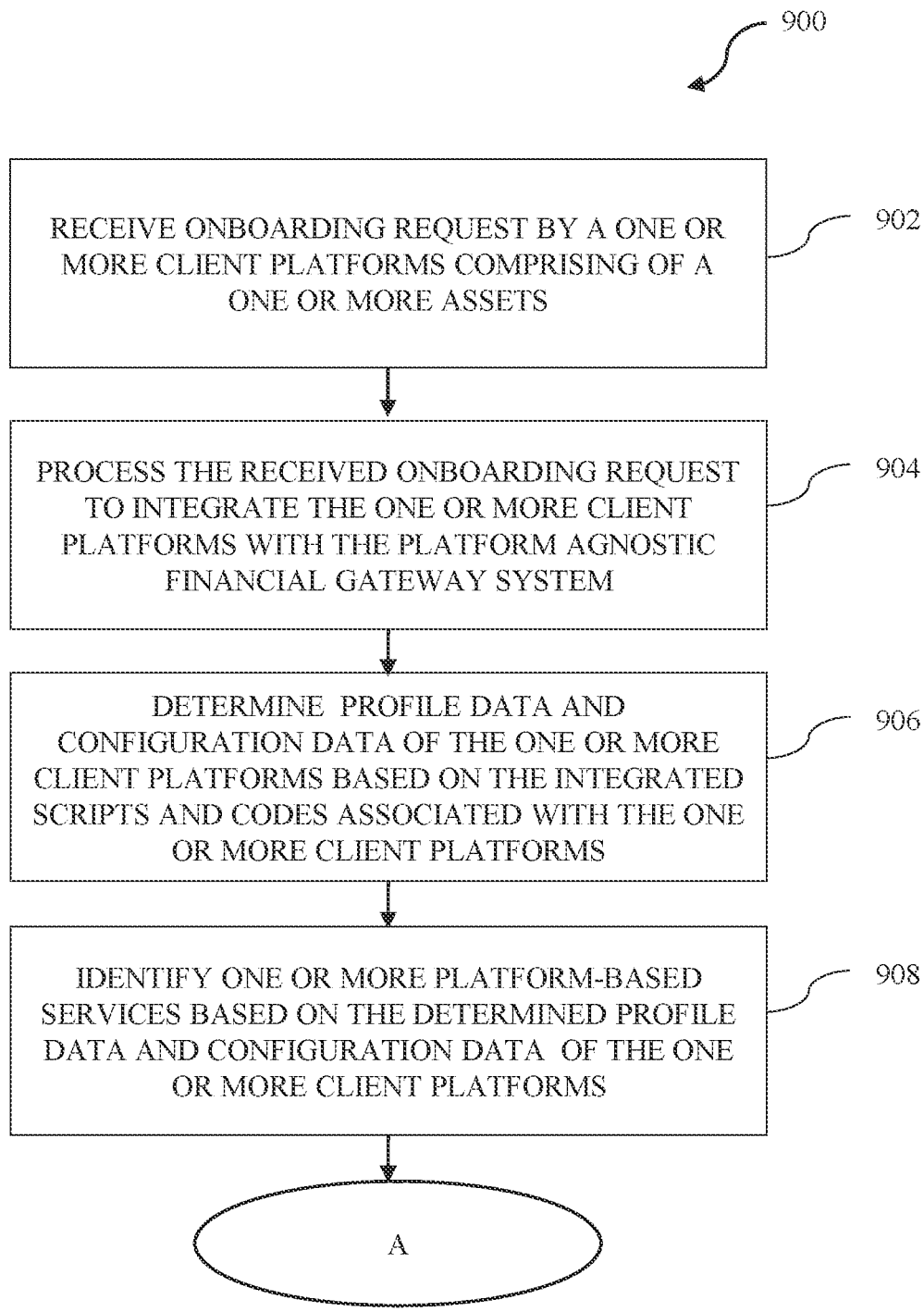
FIG. 9 (contd)

PLATFORM AGNOSTIC FINANCIAL GATEWAY SYSTEM AND METHOD FOR MANAGING FINANCIAL TRANSACTIONS

FIELD OF INVENTION

Embodiments of the present disclosure relate to a Business to Business to Consumer (B2B2C) personal financing solution, and more particularly relates to a platform agnostic financial gateway system and method for managing financial transactions.

BACKGROUND

E-commerce corresponds to a process of buying or selling products or services over the internet. E-commerce is poised to grow further in the next few years. Business enterprises should establish a good entry point as early as now to take advantage of the impending boom. E-commerce (online shopping) is increasingly popular due to its speed and ease of use for a one or more customers. E-commerce activities such as selling online can be directed at one or more customers or a one or more businesses. Business to Consumer (B2C) involves the online sales of goods, services, and provision of information directly to customers. Business to Business (B2B) refers to the online selling of products, services, or information between one or more businesses. E-commerce helps business enterprises reach new markets thereby increasing sales and revenues. In the conventional system, if a business enterprise is interested in selling to other business enterprises, the internet is utilized to find sales leads, announce calls for tender and offer products for sale either through its own business enterprise website or through another E-commerce website.

However, personal unsecured financing solutions are limited to the one or more customers of the one or more E-commerce websites. Additionally, the conventional unsecured financing solutions are inclusive of hidden charges resulting in additional losses to the one or more customers. Moreover, the conventional personal unsecured financing solutions available at the one or more E-commerce websites require extra processing time, resulting in delay of the unsecured financing solutions reaching the one or more customers.

Hence, there is a need for an improved, configurable, and data-driven, system and method for facilitating a financing gateway in financial transactions on client platforms, in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

Business to business to consumer (B2B2C) is an E-commerce model that combines business to business (B2B) and business to consumer (B2C) for a complete product or service transaction. B2B2C is a collaboration process that, in theory, creates mutually beneficial service and product delivery channels.

In accordance with an embodiment of the present disclosure, a platform agnostic financial gateway system and method for managing financial transactions is disclosed. A platform agnostic financial gateway system for managing financial transactions on client platforms, comprises, one or more hardware processors, and a memory coupled to the one or more hardware processors. The memory comprises a plurality of modules in the form of programmable instructions executable by the one or more hardware processors. The plurality of modules comprises an input receiver module configured to receive an onboarding request by a one or more client platforms. The onboarding request comprises of a one or more assets. The one or more client platforms corresponds to one or more product domains. The one or more assets comprise of brand logo, brand icons, images, configuration of the one or more client platforms. The onboarding request comprises an application identifier, codes and scripts associated with the one or more client platforms. The plurality of modules comprises of an integration module configured to process the received onboarding request to integrate the one or more client platforms with the platform agnostic financial gateway system. In processing the received onboarding request, the integration module is configured to implement the following steps. In the first step, the integration module integrates scripts and codes associated with the one or more client platforms to configure the one or more client platforms based on the received onboarding request. In the second step, the integration module, authenticates the one or more client platforms based on the received onboarding request. Further, the plurality of modules comprises of a content management module configured to determine profile data and configuration data of the one or more client platforms based on the integrated scripts and codes associated with the one or more client platforms upon successful authentication of the one or more client platforms. Further, the plurality of modules, comprises of a service provider module configured to execute the following steps. In the first step, the service provider module identifies one or more platform-based services based on the determined profile data and configuration data of the one or more client platforms. Additionally, the identification of the platform-based services is done by generating an API key and storing all the configuration details, inclusive of platform-based services against the API key. The API key generation and validation is mandatory for the first interaction between one or more client platforms and the platform agnostic financial gateway system. The API key is leveraged to extract the merchant profile data and identify the platform-based services to be offered. In the second step, the service provider module, determines one or more capabilities of the one or more client platforms to interact with the platform agnostic financial gateway system based on the determined profile data and the configuration data of the one or more client platforms. Furthermore, the plurality of modules, comprises of a dynamic form generation module configured to generate a dynamic screen workflow based on the one or more assets, identified one or more platform-based services, the determined one or more capabilities of the one or more client platforms, the determined profile data, and the configuration data of the one or more client platforms. The templates are typically the screens or forms required to obtain financing or lending information from the one or more customers. The uniqueness arises in the ability for each of the one or more client platforms to define their forms and branding along with the platform's capability to dynamically render different forms, images and branding as configured for each of the of the one or more client platforms giving them a white-labeled service. Additionally, the plurality of modules, comprises of a service management module configured to implement the following steps. In the first step, the service management module renders the generated dynamic screen workflow on a user interface of the one or more client platforms for enabling one or more customers to select one or more platform-based services and one or more payment options based on the identified one or more platform-based services. The one or more platform-based services comprises of pre-qualification, loan application, loan administration, autopay, payments, fraud, reconciliation reporting and profile management. In the second step, the service management module, receives a user selection of one service from among the one or more platform-based services via the one or more client platforms. In the third step, the service management module, manages the one or more platform-based services rendered to the one or more customers via the one or more client platforms.

Embodiment of the present disclosure also provide a non-transitory computer-readable storage medium having instructions stored therein that, when executed by a hardware processor, cause the processor to perform method steps as described above.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
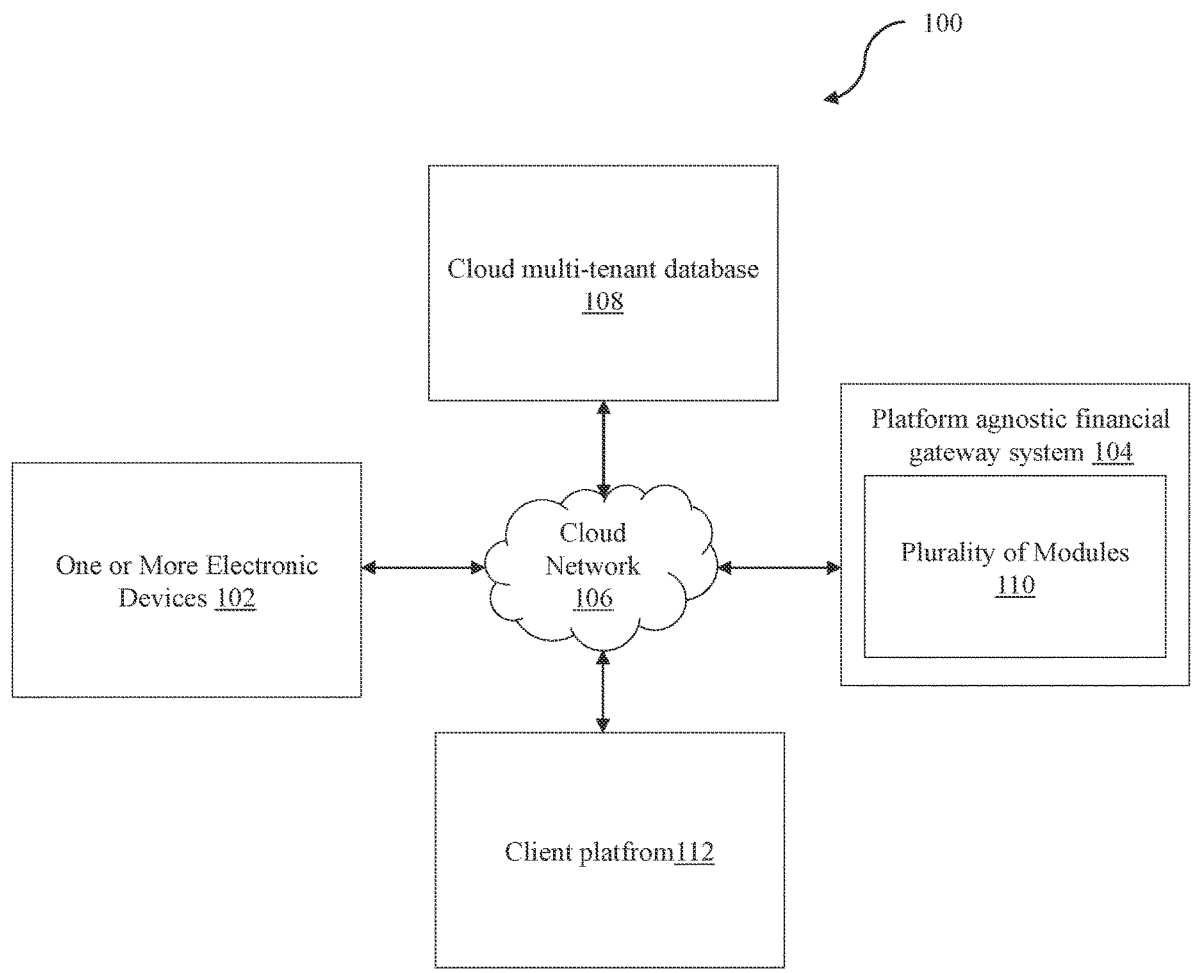
FIG. 1 is a block diagram illustrating an exemplary computing environment for facilitating a platform agnostic financial gateway system and method for managing financial transactions, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration". Any embodiment or implementation of the present subject matter described herein as "exemplary" is not necessarily to be construed as preferred or advantageous over other embodiments.

The terms "comprise," "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Accordingly, the term "merchant" or "one or more client platforms" or "E-commerce websites" have similar meanings and are used interchangeably throughout the embodiments of the present disclosure.

Referring now to the drawings, and more particularly to FIG. 1 through FIG. 9, where similar reference characters denote corresponding features consistently throughout the figures, there are shown preferred embodiments and these embodiments are described in the context of the following exemplary system and/or method.

FIG. 1 is a block diagram illustrating an exemplary computing environment for facilitating a platform agnostic financial gateway system and method for managing financial transactions, in accordance with an embodiment of the present disclosure. According to FIG. 1, the computing environment 100 includes one or more electronic devices 102 associated with one or more users communicatively coupled to a platform agnostic financial gateway system 104, a cloud database 108 and a client platform 112 via a cloud network 106. The one or more users include, one or more client organizations communicating through the one or more client platforms and the like. The one or more customers correspond to the individuals requesting the one or more services provided by the platform agnostic financial gateway system 104 for the purchase of commodities, goods, and services through the one or more client platforms. The one or more client platforms correspond to E-commerce platforms facilitating the platform agnostic financial gateway system 104 to the one or more customers. The platform agnostic financial gateway system 104 (herein after referred to as the platform agnostic financial gateway system 104, the platform agnostic financial gateway computer system 104, the computing system 104, or the financing gateway computing system 104) further facilitates the unsecured financing solutions to the one or more users through the one or more client platforms. In an exemplary embodiment of the present disclosure, the one or more electronic devices 102 may include a laptop computer, desktop computer, tablet computer, smartphone, wearable device, a digital camera and the like. Further, the network 106 may be internet or any other wireless network 106. The computing system 104 may be hosted on a central server, such as cloud server or a remote server.

Further, the computing environment 100 includes the cloud multi-tenant database 108, communicatively coupled to the computing system 104 via the network 106. In an embodiment of the present disclosure, the cloud multi-tenant database 108 stores the details of the one or more client platforms corresponding to the one or more client organizations, loan type details, one or more services, one or more platform-based services, one or more customer details, financing details such as amount to be cleared, installments remaining, total number of installments, financing instrument details, financial data and the like, corresponding to the each of the one or more customer. The financing instrument details correspond to the details of the transaction instruments comprising of bank account, credit card, debit card, VISA® card, electronic wallet (e-wallet), and the like, the financial data includes a set of financial files of one or more financial formats. For example, the one or more financial formats include National Automated Clearing House Association (NACHA), VISA®), Bank Administration Institute (BAI), JavaScript Object Notation (JSON), Comma-Separated Values (CSV), excel files, Hypertext Markup Language (HTML) tables, and the like. In an exemplary embodiment of the present disclosure, the one or more adapters include a File Transfer Protocol (FTP) adapter, a Secure File Transfer Protocol (SFTP), an API adapter, a Simple Storage Service (S3) adapter, a Relational Database Management System (RDBMS), a script adapter, or a combination thereof.

Furthermore, the one or more electronic devices 102 include a local browser, a mobile application, or a combination thereof. Furthermore, the one or more customers may use a web application via the local browser, the mobile application, or a combination thereof to communicate with the financing gateway computing system 104. In an exemplary embodiment of the present disclosure, the financing gateway computing system 104 may be compatible with any mobile operating system, such as android, iOS, and the like. In an embodiment of the present disclosure, the platform agnostic financial gateway system 104 includes a plurality of modules 110. Details on the plurality of modules 110 have been elaborated in subsequent paragraphs of the present description with reference to FIG. 2.

In an embodiment of the present disclosure, the platform agnostic financial gateway system 104, The plurality of modules comprises an input receiver module configured to receive an onboarding request by a one or more client platforms comprising of a one or more assets. The one or more client platforms corresponds to one or more product domains. The one or more assets comprise brand logo, brand icons, images, configuration of the one or more client platforms. The onboarding request comprises an application identifier, codes and scripts associated with the one or more client platforms. The plurality of modules comprises of an integration module configured to process the received onboarding request to integrate the one or more client platforms with the platform agnostic financial gateway system. In processing the received onboarding request, the integration module is configured to implement the following steps. In the first step, the integration module integrates scripts and codes associated with the one or more client platforms to configure the one or more client platforms based on the received onboarding request. The integration module further comprises a webdrop JS submodule. The webdrop JS submodule is a Software Development Kit (SDK) configured to determine a browser version, a device version, and an operating system(OS) version of the one or more client platform to manage behaviors of the one or more client platforms and embed one or more software modules to configure the one or more client platforms based on the received onboarding request. In the second step, the integration module, authenticates the one or more client platforms based on the received onboarding request. The integration module authenticates by an API key generation module configured to generate, allocate and authenticate an API key to the one or more client platforms based on the received onboarding request. The API key corresponds to a unique key enabling the platform agnostic financial gateway system 104 to identify the one or more client platforms. Further the plurality of modules, comprises of a content management module configured to determine profile data and configuration data of the one or more client platforms based on the integrated scripts and codes associated with the one or more client platforms upon successful authentication of the one or more client platforms. Further, the plurality of modules, comprises of a service provider module configured to execute the following steps. In the first step, the service provider module identifies one or more platform-based services based on the determined profile data and configuration data of the one or more client platforms. Additionally, the identification of the platform-based services is done by generating the API key and storing all the configuration details, inclusive of platform-based services against the API key. The API key generation and validation is mandatory for the first interaction between one or more client platforms and the platform agnostic financial gateway system. The API key is leveraged to extract the merchant profile data and identify the platform-based services to be offered. In the second step, the service provider module, determines one or more capabilities of the one or more client platforms to interact with the platform agnostic financial gateway system 104 based on the determined profile data, the configuration data of the one or more client platforms. The capabilities comprise button format and styling, functions for data sharing, webhooks and event handlers. The event handlers capability of the one or more client platforms is configured to determine and display live status of the selected service. The event handlers are configured to manage application forms filled, service offers provided, service offers selected, and pre-approved financing. Furthermore, the plurality of modules, comprises of a dynamic form generation module configured to generate a dynamic screen workflow based on the one or more assets, identified one or more platform-based services, the determined one or more capabilities of the one or more client platforms, the determined profile data, and the configuration data of the one or more client platforms. The dynamic screen workflows are generated dynamically using templates. The templates are typically the screens or forms required to obtain financing or lending information from the one or more customers. The uniqueness arises in the ability for each of the one or more client platforms to define their forms and branding and the platform's capability to dynamically render different forms, images and branding as configured for each the of the one or more client platforms giving them a white-labeled service. Additionally, the plurality of modules, comprises of a service management module configured to implement the following steps. In the first step, the service management module renders the generated dynamic screen workflow on a user interface of the one or more client platforms for enabling one or more customers to select one or more platform-based services and one or more payment options based on the identified one or more platform-based services. The one or more platform-based services comprises of pre-qualification, loan application, loan administration, autopay, payments, fraud, reconciliation reporting and profile management. In the second step, the service management module, receives a user selection of one service from among the one or more platform-based services via the one or more client platforms. In the third step, the service management module, manages the one or more platform-based services rendered to the one or more customers via the one or more client platforms. Additionally, the service management module is configured to generate one or more service summary reports based on event status message, one or more exceptions and the like. Furthermore, the service management module is configured to generate one or more recommendation messages for handling the one or more services based on pre-stored solution table.

Further, in order to manage the one or more platform-based services rendered to the one or more customers via the one or more client platforms, the service management module is configured to execute the following steps. In the first step, the service management module, route the one or more customers based on the rendered dynamic screen workflow to a mobile application for completing an application process of a selected service. In the second step, the service management module, displays one or more phases of the selected service. In the third step, the service management module, displays one or more exceptions on the graphical user interface screen of one or more mobile devices. The one or more exceptions comprise duplicate transactions, missing transactions, transactions posted to a wrong account, accounting errors, timing differences, and lender errors. The one or more exceptions are outputted in one or more output formats for allowing one or more operators to handle the one or more exceptions and one or more aged reconciliation issues. The one or more output formats comprise native excel sheets with transaction data, Portable Document Formats (PDFs), dashboards and reports. In the fourth step, the service management module, dynamically tracks the selected service on the one or more client platforms by periodically obtaining event status message from the one or more client website via an event listener module.

Figure 2:
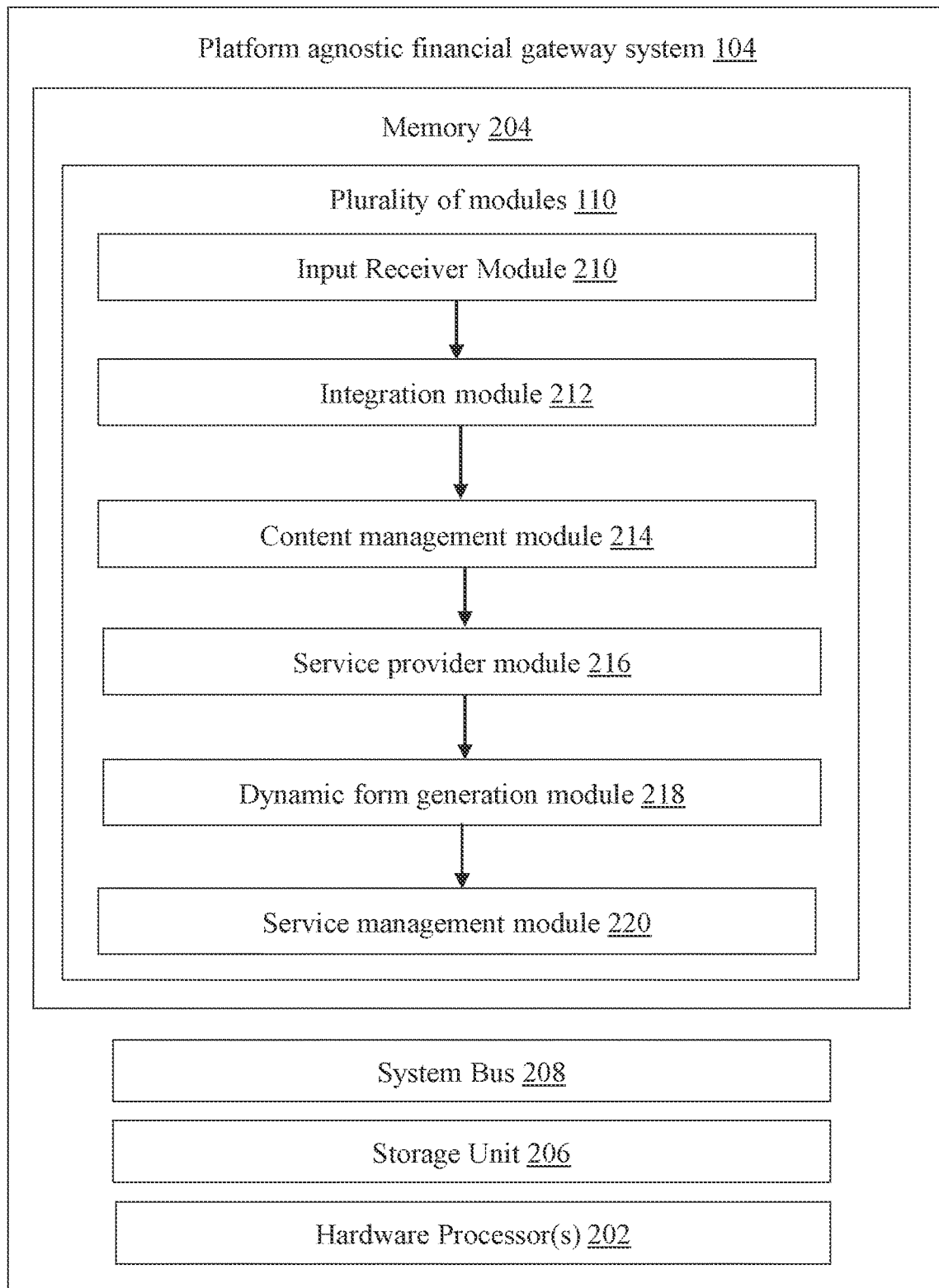
FIG. 2 is a block diagram illustrating an exemplary platform agnostic financial gateway system for managing financial transactions, in accordance with an embodiment of the present disclosure.

FIG. 2 is a block diagram illustrating an exemplary platform agnostic financial gateway system 104 for managing financial transactions, in accordance with an embodiment of the present disclosure. Further, the platform agnostic financial gateway system 104 includes one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 110 in the form of programmable instructions executable by the one or more hardware processors 202. Further, the plurality of modules 110 includes an input receiver module 210, an integration module 212, a content management module 214, a service provider module 216, a dynamic form generation module 218 and a service management module 220.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 110 stored in the form of machine-readable instructions on any of the above-mentioned storage media and may be in communication with and executed by the one or more hardware processors 202.

In an embodiment of the present disclosure, the storage unit 206 is a cloud storage. The storage unit 206 is a part of the cloud based multi-tenant database 108, the cloud based multi-tenant database 108 comprises of a content management services. The content management services stores all the localized versions of data generated for each phase of the platform agnostic financial gateway system 104, holds any static content and files, maintains a configuration of phrase key with the corresponding text in a HTTP resource based API, resolves phrases with embedded variables such as industry key, determines and stores a default locale in no support scenario's, cache is pre-populated on app instance boot strap and refreshed on schedule, the one or more exceptions, and the like. The platform agnostic financial gateway system 104 comprises of two types of keys. Firstly, a merchant key is an encoded way to identify a merchant in the platform agnostic financial gateway system 104. For example, MERCH$$11 $$ issued for the one or more client platform. The merchant key is used as a handshake to begin with. Secondly, the API key is issued for every instance of the merchant browser of the one or more client platforms. In an exemplary embodiment of the present disclosure, a customer X in California accessing the client platform will leverage "MERCH$$11$$" and will obtain a random GUID {6B29FC40-CA47-1067-B31D-00DD010662DA} for interactions. Another customer Y, in New York accessing the merchant website may leverage the same merchant key "MERCH$$11$$" but will get a random GUID {9f0b68cf-8e93-4a66-ac10-083e07f367fe} for their interactions.

The input receiver module 210 is configured to receive an onboarding request by a one or more client platforms comprising of a one or more assets. The one or more client platforms corresponds to one or more product domains. The one or more assets comprise brand logo, brand icons, images, configuration of the one or more client platforms. The onboarding request comprises an application identifier, codes and scripts associated with the one or more client platforms. The integration module 212, is configured to process the received onboarding request to integrate the one or more client platforms with the platform agnostic financial gateway system 104. In processing the received onboarding request, the integration module 212 is configured to execute the following steps. In the first step, the integration module 212, integrates scripts and codes associated with the one or more client platforms to configure the one or more client platforms based on the received onboarding request. The integration module 212, comprises a webdrop JS submodule. The webdrop JS submodule is a Software Development Kit (SDK) configured to determine a browser version, a device version, and an operating system (OS) version of the one or more client platform to manage behaviors of the one or more client platforms and embed one or more software modules to configure the one or more client platforms based on the received onboarding request. Additionally, in integrating the scripts, the integration module 212 integrates the scripts and codes associated with the one or more client platforms to configure the one or more client platforms based on the received onboarding request. The integration module 212, is configured to identify a HTML tag in the one or more client platform to inject an iframe and a dynamic button into the tag identified, wherein a software language code is shared with one or more client platform developers to inject an entry point in the one or more client platforms. Moreover, the integration module 212 is further configured to configure the one or more client platform with customisation and localization requirements and exchange security keys for each of the one or more client platforms. The configuration data of the one or more client platforms comprises of a script and a code to embed the platform agnostic financial gateway system 104 entry point into backend of the one or more client platforms. In the second step, the integration module 212, authenticates the one or more client platforms based on the received onboarding request. In order to authenticate the one or more client platforms, the integration module comprises of an API key generation module configured to generate, allocate and authenticate an API key to the one or more client platforms based on the received onboarding request. The API key corresponds to a unique key enabling the platform agnostic financial gateway system 104 to identify the one or more client platforms.

The content management module 214, is configured to determine profile data and configuration data of the one or more client platforms based on the integrated scripts and codes associated with the one or more client platforms upon successful authentication of the one or more client platforms.

The service provider module 216 is configured to execute the following steps. In the first step, the service provider module 216, identifies one or more platform-based services based on the determined profile data and configuration data of the one or more client platforms. Additionally, the identification of the platform-based services is done by generating the API key and storing all the configuration details, inclusive of platform-based services against the API key. The API key generation and validation is mandatory for the first interaction between one or more client platforms and the platform agnostic financial gateway system. The API key is leveraged to extract the merchant profile data and identify the platform-based services to be offered. The one or more platform—based services comprises of pre-qualification, loan application, loan administration, autopay, payments, fraud, reconciliation reporting and profile management.

In the second step, the service provider module 216, determines one or more capabilities of the one or more client platforms to interact with the platform agnostic financial gateway system 104 based on the determined profile data, the configuration data of the one or more client platforms and the like. The one or capabilities comprise button format and styling, functions for data sharing, webhooks and event handlers. Further, the event handler's capability of the one or more client platforms is configured to determine and display live status of the selected service from the one or more platform-based services. The event handlers are configured to manage application forms filled, service offers provided, service offers selected, pre-approved financing and the like. Furthermore, in determining the one or more capabilities of the one or more client platforms to interact with the platform agnostic financial gateway system 104 based on the determined profile data, the configuration data of the one or more client platforms, the service provider module 216 configured to execute the following step. In the first step, the service provider module 216, applies the determined profile data, the configuration data of the one or more client platforms onto a trained artificial intelligence-based service capability model. In the second step, the service provider module 216 determines one or more capabilities of the one or more client platforms to interact with the platform agnostic financial gateway system 104 based on the output of the trained artificial intelligence-based service capability model.

The dynamic form generation module 218, is configured to generate a dynamic screen workflow based on the one or more assets, identified one or more platform-based services, the determined one or more capabilities of the one or more client platforms, the determined profile data, and the configuration data of the one or more client platforms. Dynamic screen workflows are generated by templates. The templates are typically the screens or forms required to obtain financing or lending information from the one or more customers. The uniqueness arises in the ability for each of the one or more client platforms to define their forms and branding and the platform's capability to dynamically render different forms, images and branding as configured for each the of the one or more client platforms giving them a white-labeled service.

The service management module 220 is configured to execute the following steps. In the first step, the service management module 220, renders the generated dynamic screen workflow on a user interface of the one or more client platforms for enabling one or more customers to select one or more platform-based services and one or more payment options based on the identified one or more platform-based services. In the second step, the service management module 220 receives a user selection of one service from among the one or more platform-based services via the one or more client platforms. In the third step, the service management module 220 manages the one or more platform-based services rendered to the one or more customers via the one or more client platforms. In managing the one or more platform-based services rendered to the one or more customers via the one or more client platforms, the service management module 220 is configured to execute the following steps. In the first step, the service management module 220, route the one or more customers based on the rendered dynamic screen workflow to a mobile application for completing an application process of a selected service. In the second step, the service management module 220 display one or more phases of the selected service. In the third step, the service management module 220, display one or more exceptions on the graphical user interface screen of one or more mobile devices. The one or more exceptions comprise duplicate transactions, missing transactions, transactions posted to a wrong account, accounting errors, timing differences, and lender errors. The one or more exceptions are outputted in one or more output formats for allowing one or more operators to handle the one or more exceptions and one or more aged reconciliation issues. The one or more output formats comprise native excel sheets with transaction data, Portable Document Formats (PDFs), dashboards and reports. In the fourth step, the service management module 220, dynamically tracking the selected service on the one or more client platforms by periodically obtaining event status message from the one or more client website via an event listener module. In the fourth step, the service management module 220, dynamically tracks the selected service on the one or more client platforms by periodically obtaining event status message from the one or more client website via an event listener module. The service management module 220, is further configured to generate one or more service summary reports based on event status message, one or more exceptions and generate one or more recommendation messages for handling the one or more services based on pre-stored solution table.

Figure 3:
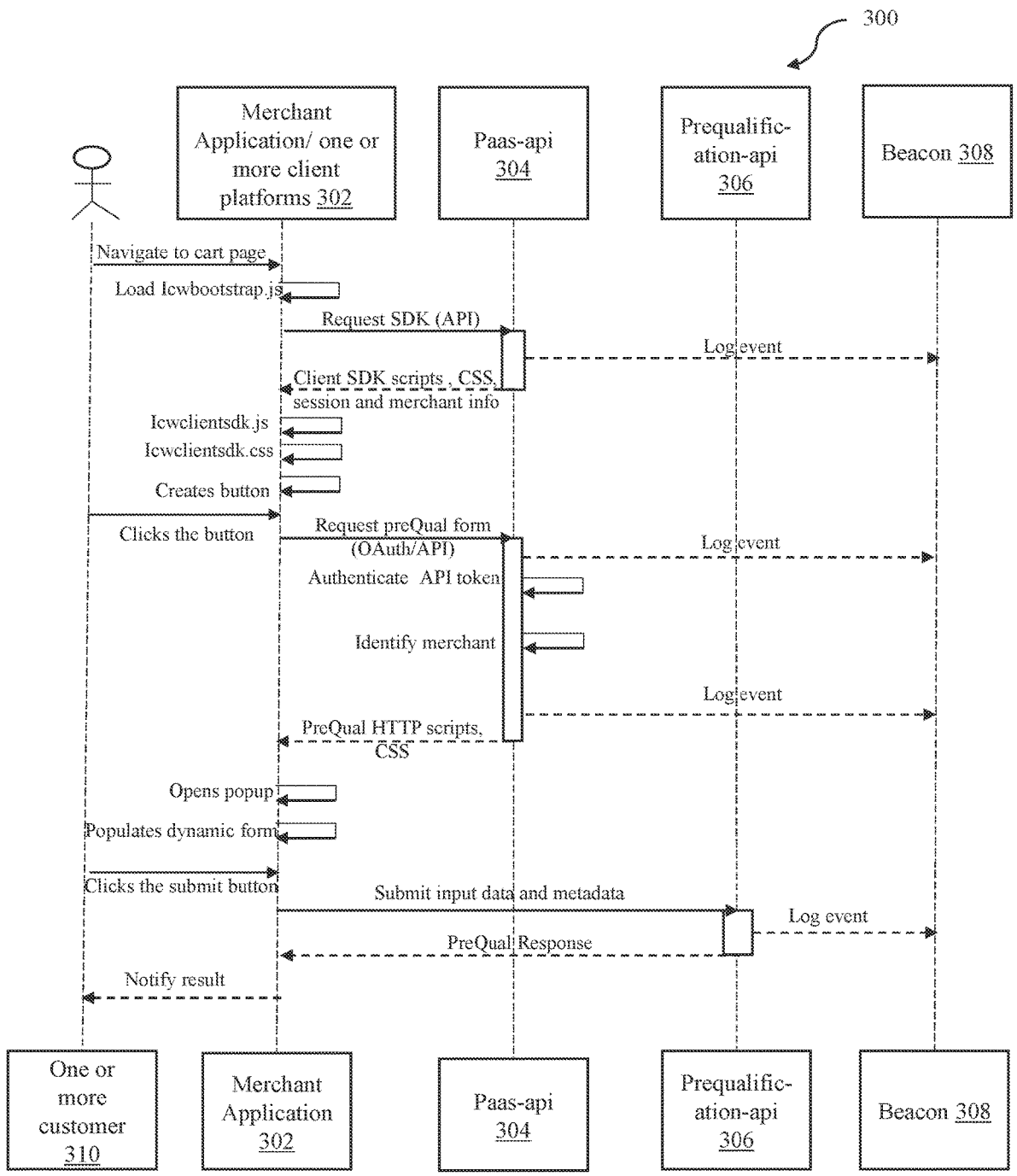
FIG. 3 is a sequence flow diagram illustrating an exemplary process facilitating the platform agnostic financial gateway system and method for managing financial transactions, in accordance with an embodiment of the present disclosure.

FIG. 3 is a sequence flow diagram illustrating an exemplary process facilitating the platform agnostic financial gateway system 104 for managing financial transactions, in accordance with an embodiment of the present disclosure. A sequence flow diagram depicts interactions between objects in a sequential order. That is, the order in which the interactions take place. FIG. 3 illustrates interactions between the objects/actors and lifelines. FIG. 3 illustrates interactions between five objects/actors and four lifelines. The object/actor in a sequence flow diagram represents a type of role interacting with the system and its objects. However, it is noted that object/actor is always outside the scope of the system aimed to model using the sequence flow diagram. Additionally, a lifeline is a named element which depicts an individual participant in a sequence flow diagram. Each instance in a sequence diagram is represented by a lifeline. Lifeline elements are located at the top in a sequence diagram. According to FIG. 3, each of the one or more customers approaching the one or client websites correspond to the actors. The four lifelines or interactive components within the system include a merchant application/one or more client platform 302, a paas-api (Platform as a service-application programming interface) 304, Prequal-API (Pre-Qualification Application Programming Interface) 306 and Beacon 308. The paas-api 304 corresponds to the internet facing workflow interface from the platform agnostic financial gateway system 104 which may be leveraged by all the one or more client platforms onboarded to the platform agnostic financial gateway system 104. The paas-api 304 is secure, abstracted and the core orchestration layer of the platform agnostic financial gateway system 104. The Prequal-API 306 corresponds to the core funding and financing layer. The beacon 308 traces the flow of events occurring on the browser of each of the one or more customers. The merchant application 302 refers to the one or more client platforms. Both the terms merchant application 302 and the one or more client platforms have similar meanings and are used interchangeably throughout the embodiments of the present disclosure. In the first step, the one or more customers navigate to the cart page of the merchant application 302. On the one or more customers 310 reaching the merchant application 302, the merchant application 302 loads an Icwbootstrap.js. The Icwbootstarp.js is loaded onto the one or more client platform dynamically, thereby enabling the invocation of the platform agnostic financial gateway system 104 from the one or more client platforms. On loading the Icwbootsrap.js the merchant application 302 requests a software development Kit (SDK) Application Programming Interface (API) to the Paas-api 304. Based on the received request the Paas-api 304 sends a log event to the beacon 308 thereby conveying to the platform agnostic financial gateway system 104 the presence of the one or more customers 310 on the merchant application 302 registered with the one or financing gateway computing system 104. On sending the log event to the beacon 308 the Paas-api 304 replies to the merchant application 302 with client SDK, scripts. CSS session and the information of the merchant or one or more client platforms. On receiving the Client SDK, scripts, CSS, session, and merchant information the merchant application 302 processes the Icwclientsdk.js. Further, the merchant application 302 processes the Icwclient sdk.css. furthermore, the merchant application 302 creates a button with regard to the financing solution. The button illustrates the Pay later option enabling the one or more customers 310 to access the financing solution facilitated by the financing gateway computing system 104. On the creation of the button the one or more customers 310 clicks the button with the pay later option. On clicking the button, the merchant application 302 generates the request for a prequalification form to the paas api 304. The prequalification form corresponds to the templates. On receiving the request of the prequalification form generated, a log event is sent to the beacon 308 thereby updating the platform agnostic financial gateway system 104 of the financing request obtained by the one or more customers 310. On sending the log event to the beacon 308 the paas api 304 then authenticates the API token based on the received request. On authenticating the API token, the paas-api 304 identifies the merchant application or one or more client platforms 302 based on the authenticated API token. On Authentication the API token the paas-api 304 sends a log event to the beacon 308, thereby informing the platform agnostic financial gateway system 104 about the financing request received by the identified merchant. On sending the log event to the beacon 308, the paas-api 304 generates and sends back pre-qualification HTTP scripts, and CSS codes to the merchant application 302. On receiving the pre-qualification HTTP scripts, and CSS codes the merchant application 302 opens pop up and populates a dynamic form with the one or more customer details, one or more product details, financial details, financial instrument details, loan type details and the like. On viewing the populated dynamic form, the one or more customers 310 clicks the submit button. On the submit button action by the one or more customers 310 the merchant application 302 submits the input data and metadata corresponding to the dynamic form to the prequalification-api 306. On evaluating the input data and metadata the prequalification-api 306 sends the log event to the beacon 308. On evaluating the input data and metadata the prequalification-api 306 sends the prequalification responses regarding the approval or disapproval of the financing solutions. The prequalification responses correspond to a form based on user inputs which enable the one or more customers to choose from various financing options available. On receiving the prequalification responses, the merchant application 302 notifies the result to the one or more customers 310 through the one or more electronic devices 102.

Figure 4A:
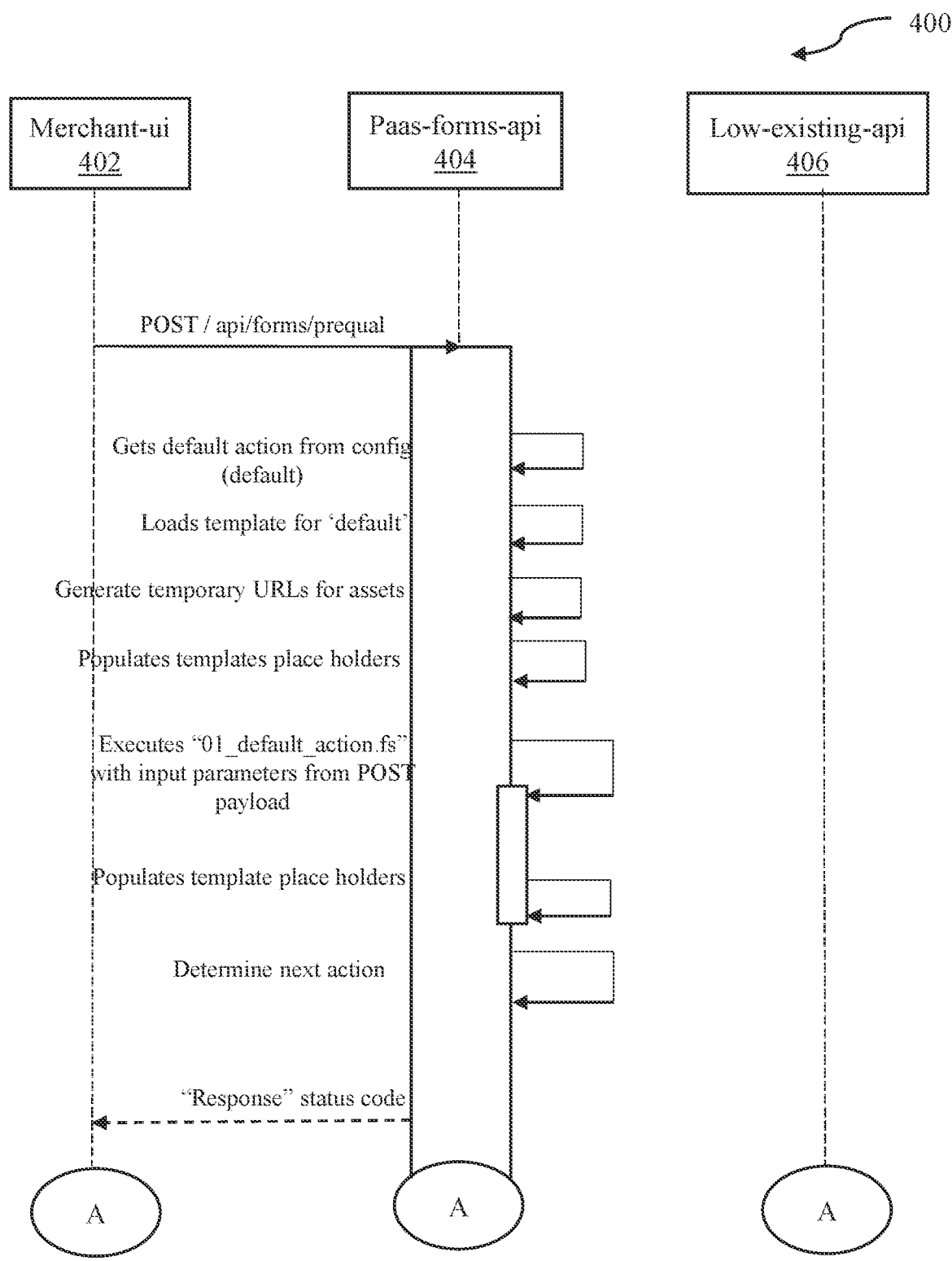
FIGS. 4A-D are a sequence flow diagrams illustrating an exemplary process of the computing system for facilitating the platform agnostic financial gateway system and method for managing financial transactions, in accordance with an embodiment of the present disclosure.

FIGS. 4A-D are sequence flow diagrams 400 illustrating an exemplary process of the computing system for facilitating the platform agnostic financial gateway system and method 104 for managing financial transactions, in accordance with an embodiment of the present disclosure. FIGS. 4A-D depicting the sequence flow diagram illustrates three lifelines or interactive components. The three interactive components include merchant-ui 402, paas-forms-api 404 and low-existing-api 406. The paas-forms-api 404 corresponds to the internet facing workflow interface from the platform agnostic financial gateway system 104 that gets leveraged by all of the one or more client platforms onboarded to the platform agnostic financial gateway system 104. FIG. 4A illustrates the first step of the platform agnostic financial gateway system 104 comprising of three interactive components including merchant-ui 402, paas-forms-api 404 and low-existing-api 406. The first step depicts the Pre-Qualification form. The prequalification form is a template to receive financing information for a financing application. The financing information includes name, SSN, contact details and the like. Some financing information is contextually shared between the client platform and the platform agnostic financial gateway system and method 104 while the one or more customers provides rest. The merchant-ui 402 (user-interface) sends a POST instruction to the paas-forms-api 404. On receiving the POST instruction, the paas-forms-api 404 gets default action from the configuration. On receiving the default configuration, the paas-forms-api 404 loads a default template. On loading the default template, the paas forms api generates temporary URLs for the one or more assets received by the one or more client organisations. The one or more assets include images, CSS, scripts, logo, and the like. On generating the temporary URLs for assets, the paas-forms-api 404 executes a "01_default_action. fs" which is the action script for the first step, with input parameters from POST payload. On executing the "01_default_action. fs" the paas-forms-api 404 populates template place holders corresponding to the values derived in action script. On populating the template place holder, the paas-forms-api 404 determines the next action to display loan options to the one or more customers. The paas-forms-api 404 sends a response to the merchant-ui 402. The response comprises of the status code such as 202 i.e.: accepted, location i.e.: URL and payload template.

Figure 4B:
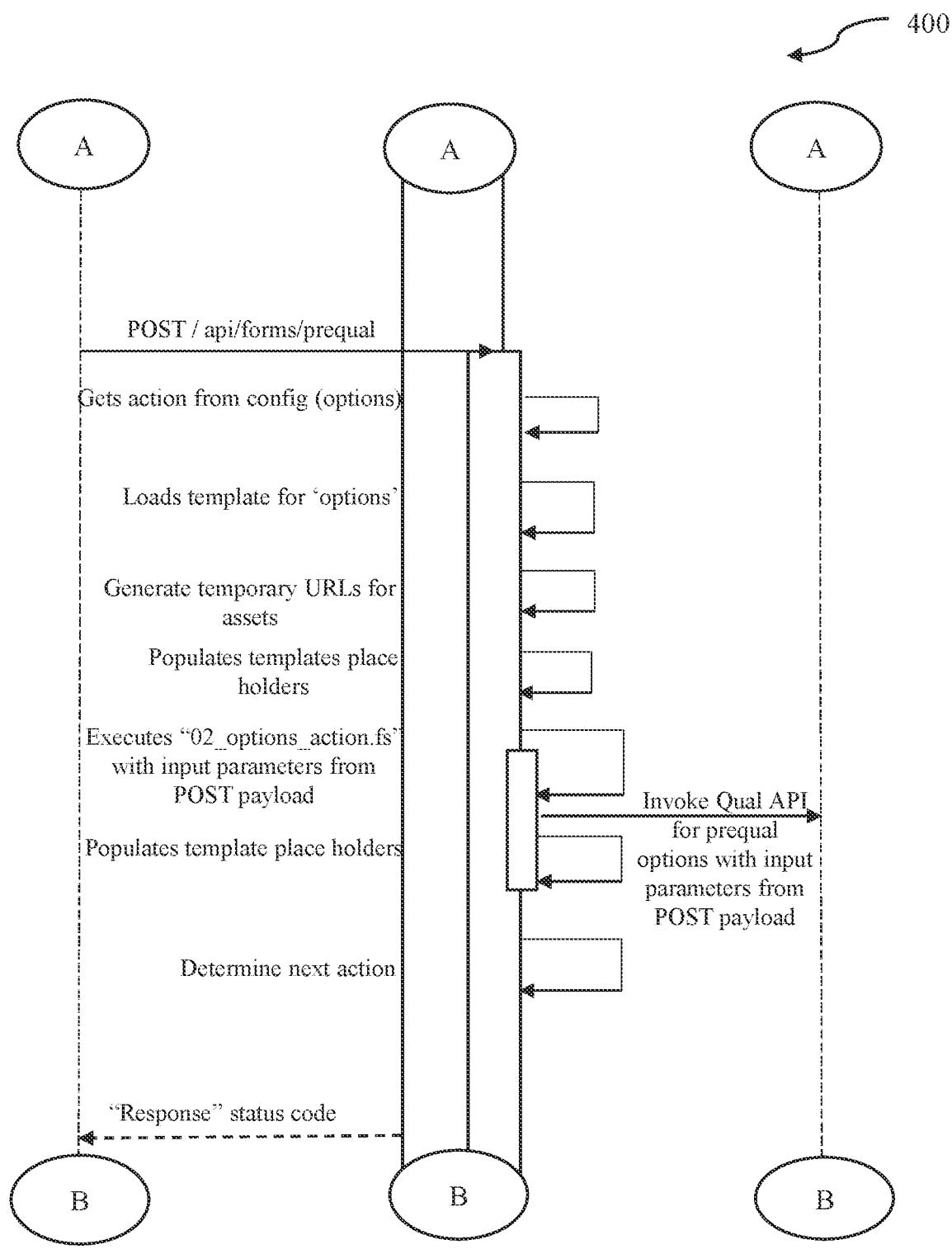

FIG. 4B illustrates the second step of the platform agnostic financial gateway system 104 comprising of three interactive components including merchant-ui 402, paas-forms-api 404 and low-existing-api 406. The second step depicts selecting the offer from generated loan options. The second step initiates with the creation of a new process over the existing process which includes the merchant-ui 402 (user-interface) sending a POST instruction to the paas-forms-api 404. On receiving the POST instruction, the paas-forms-api 404 gets options action from the configuration. On receiving the default configuration, the paas-forms-api 404 loads a default template for loan options. On loading the default template for loan options, the paas forms api generates temporary URLs for the one or more assets received by the one or more client organisations. The one or more assets include images, CSS, scripts, logo, and the like. On generating the temporary URLs for assets, the paas-forms-api 404 executes a "02_options_action.fs" which is the action script for the second step, with input parameters from POST payload. On executing the "02_options_action. fs" the paas-forms-api 404 sends an invoke API for prequalification options with input parameters from POST payload. On sending the invoke request to the low-existing-api 406, the paas-forms-api 404 populates template place holders corresponding to the values derived in action script. On populating the template place holder, the paas-forms-api 404 determines the next action to display offers to the one or more customers. The paas-forms-api 404 sends a response to the merchant-ui 402. The response comprises of the status code such as 202 i.e.: accepted, location i.e.: URL and payload template.

Figure 4C:
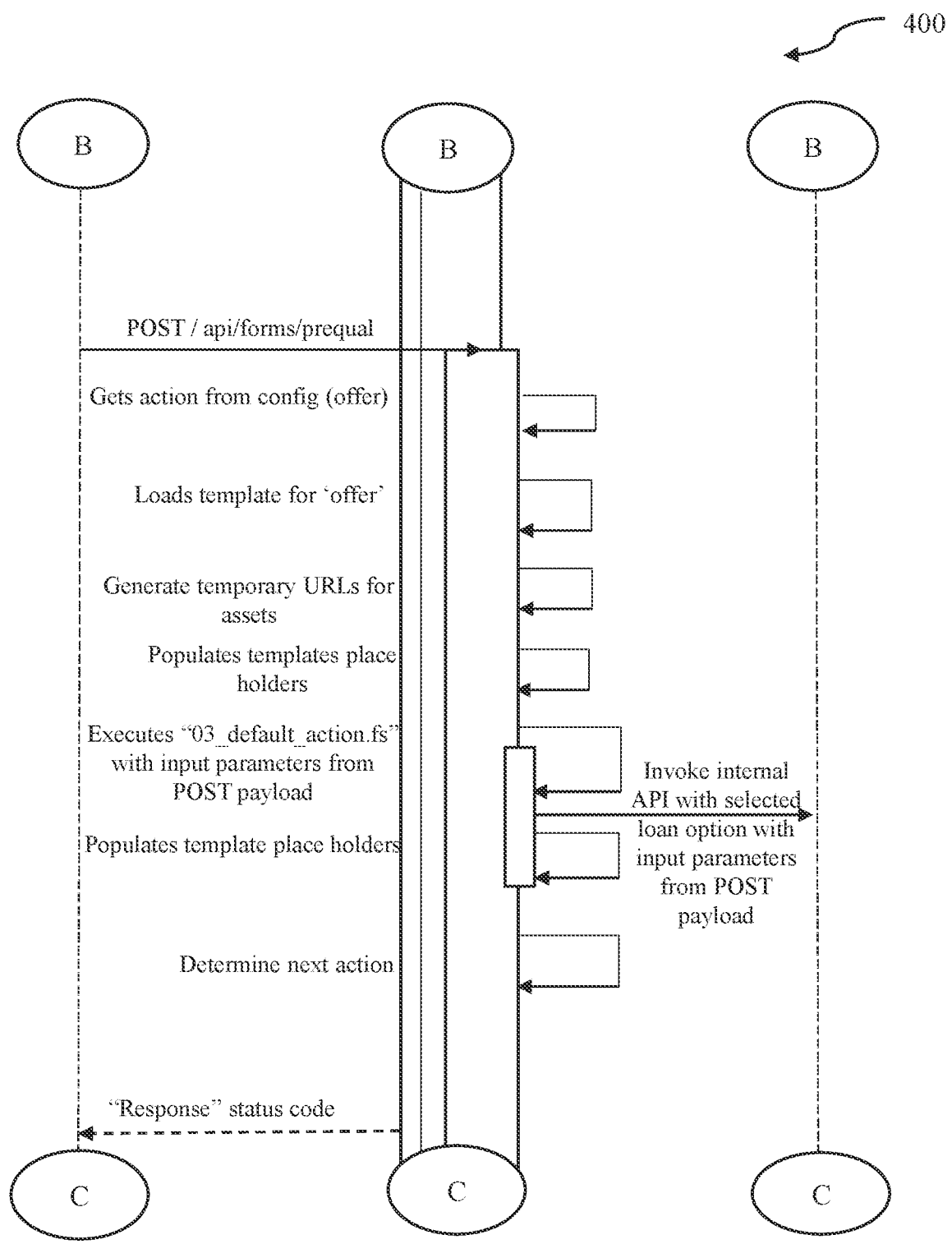

FIG. 4C illustrates the third step of the platform agnostic financial gateway system 104 comprising of three interactive components including merchant-ui 402, paas-forms-api 404 and low-existing-api 406. The third step depicts accepting the selected offer. The third step initiates with the creation of a new process over the existing two processes which includes the merchant-ui 402 (user-interface) sending a POST instruction to the paas-forms-api 404. On receiving the POST instruction, the paas-forms-api 404 gets offer action from the configuration. On receiving the offer action from the configuration, the paas-forms-api 404 loads a default template for offers. On loading the default template for offers, the paas forms api generates temporary URLs for the one or more assets received by the one or more client organisations. The one or more assets include images, CSS, scripts, logo, and the like. On generating the temporary URLs for assets, the paas-forms-api 404 executes a "03_offer_action. fs" which is the action script for the third step, with input parameters from POST payload. On executing the "03_offer_action.fs" the paas-forms-api 404 sends an invoke API request with selected loan option with input parameters from POST payload to the low-existing-api 406. On sending the invoke request to the low-existing-api 406, the paas-forms-api 404 populates template place holders corresponding to the values derived in action script. On populating the template place holder, the paas-forms-api 404 determines the next action to display options to the one or more customers. The paas-forms-api 404 sends a response to the merchant-ui 402. The response comprises of the status code such as 202 i.e.: accepted, location i.e.: URL and payload template.

Figure 4D:
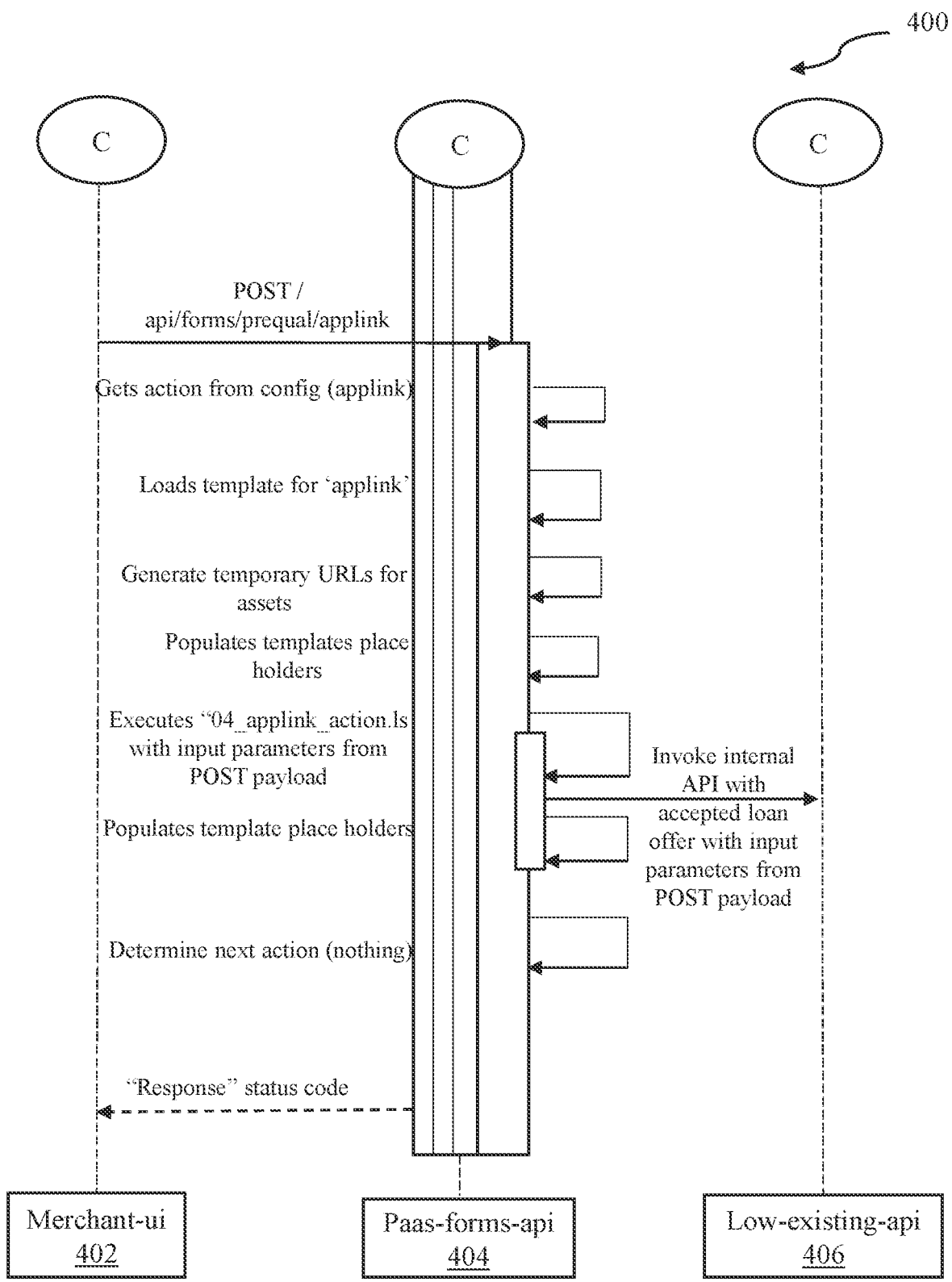

FIG. 4D illustrates the fourth step of the platform agnostic financial gateway system 104 comprising of three interactive components including merchant-ui 402, paas-forms-api 404 and low-existing-api 406. The fourth step depicts directing the one or more customers to the mobile application link in order to complete the subsequent steps based on the accepted offer. The fourth step initiates with the creation of a new process over the existing three processes which includes the merchant-ui 402 (user-interface) sending a POST instruction to the paas-forms-api 404. On receiving the POST instruction, the paas-forms-api 404 gets applink action from the configuration. On receiving the applink action from the configuration, the paas-forms-api 404 loads a default template for applinks. On loading the default template for applinks, the paas forms api generates temporary URLs for the one or more assets received by the one or more client organisations. The one or more assets include images, CSS, scripts, logo, and the like. On generating the temporary URLs for assets, the paas-forms-api 404 executes a "04_applink_action. fs" which is the action script for the fourth step, with input parameters from POST payload. On executing the "04_applink_action. fs" the paas-forms-api 404 sends an invoke API request with accepted loan offer with input parameters from POST payload to the low-existing-api 406. On sending the invoke request to the low-existing-api 406, the paas-forms-api 404 populates template place holders corresponding to the values derived in action script. On populating the template place holder, the paas-forms-api 404 determines the next action to complete the application process by the one or more customers. In case the next action does not exist, the paas-forms-api 404 terminates the process. The paas-forms-api 404 sends a response to the merchant-ui 402. The response comprises of the status code such as 200 i.e.: OK, location i.e.: URL and payload template.

Figure 5:
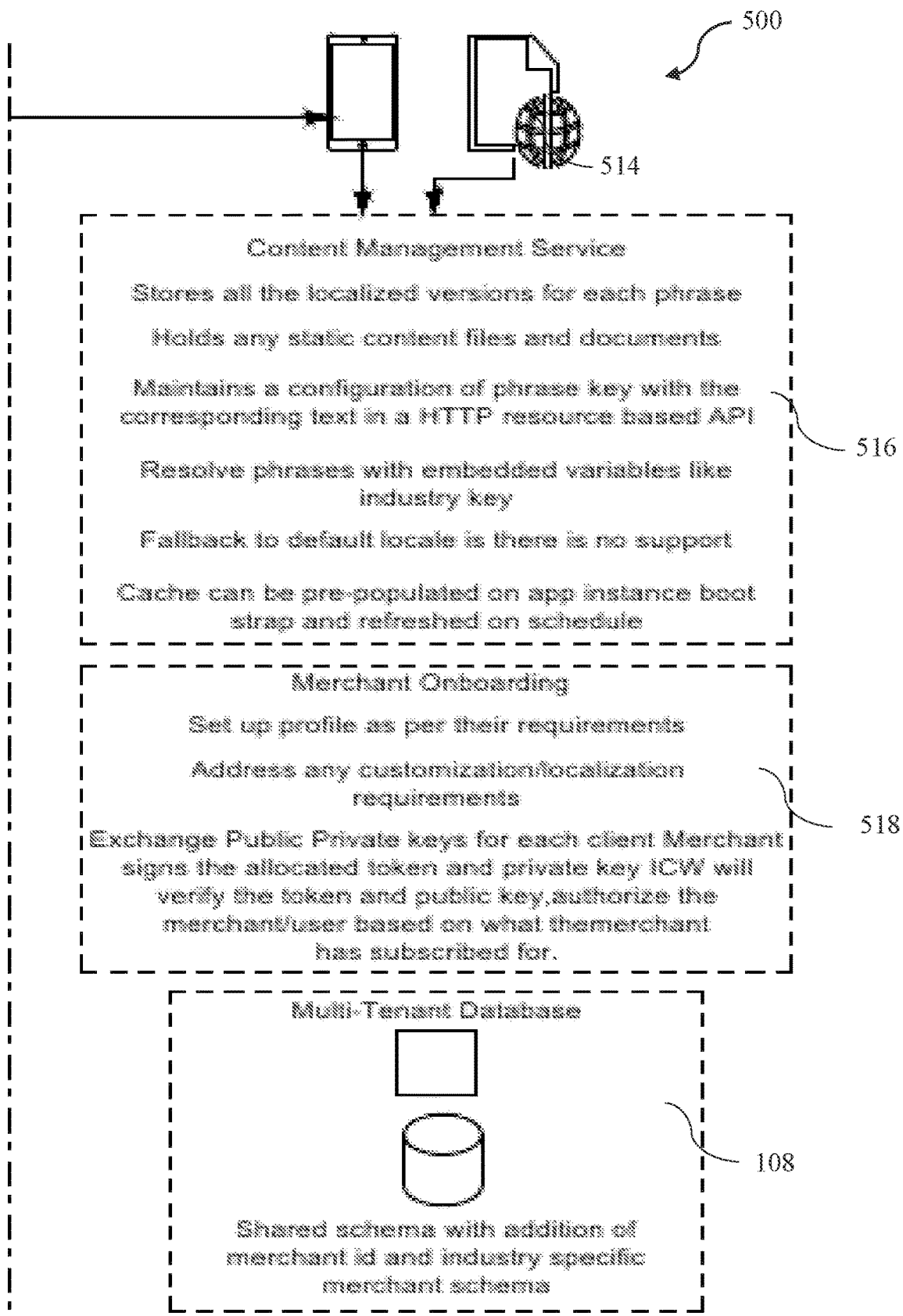
FIG. 5 is a block diagram depiction illustrating an exemplary platform agnostic financial gateway system for managing financial transactions, in accordance with an embodiment of the present disclosure.

FIG. 5 is a block diagram depiction illustrating an exemplary platform agnostic financial gateway system 104 for managing financial transactions, in accordance with an embodiment of the present disclosure. The platform agnostic financial gateway system 104 receives the onboarding request by a one or more client platforms 502 comprising of a one or more assets. The one or more client platforms corresponds to one or more product domains. The one or more assets comprise brand logo, brand icons, images, configuration of the one or more client platforms. The onboarding request comprises an application identifier, codes and scripts associated with the one or more client platforms 502. The onboarding request is received with a language header and a merchant token. The platform agnostic financial gateway system 104 further comprises of gateway services 504. The gateway services 504 implement merchant identification and configuration service. The gateway services 504 also implements Id token validation and user scope authorization, as explained in FIG. 2. The platform agnostic financial gateway system 104 further includes an aggregation service 506 with similar functionality as the integration module 212. The aggregation service 506, is similar to the integration module 212, comprises a webdrop JS submodule. The webdrop JS submodule is a Software Development Kit (SDK) configured to determine a browser version, a device version, and an operating system (OS) version of the one or more client platform to manage behaviors of the one or more client platforms and embed one or more software modules to configure the one or more client platforms based on the received onboarding request. Additionally, in integrating the scripts, the integration module 212 integrates the scripts and codes associated with the one or more client platforms to configure the one or more client platforms based on the received onboarding request. The aggregation service 506, is configured to identify a HTML tag in the one or more client platform to inject an iframe and a dynamic button into the tag identified, wherein a software language code is shared with one or more client platform developers to inject an entry point in the one or more client platforms. Moreover, the aggregation service 506 is further configured to configure the one or more client platform with customisation and localization requirements and exchange security keys for each of the one or more client platforms. The configuration data of the one or more client platforms comprises of a script and a code to embed the platform agnostic financial gateway system 104 entry point into backend of the one or more client platforms as depicted in 518.

The content management service 508 comprises of similar functionality as the content management module 214. The content management service 508, is configured to determine profile data and configuration data of the one or more client platforms based on the integrated scripts and codes associated with the one or more client platforms upon successful authentication of the one or more client platforms. The content management service 508 stores all the localized versions of data generated for each phase of the platform agnostic financial gateway system 104, holds any static content files and documents, maintains a configuration of phrase key with the corresponding text in a HTTP resource based API, resolves phrases with embedded variables such as industry key, determines and stores a default locale in no support scenario's, cache is pre-populated on app instance boot strap and refreshed on schedule, the one or more exceptions, and the like. The platform agnostic financial gateway system 104 comprises of two types of keys. Firstly, a merchant key is an encoded way to identify a merchant in the platform agnostic financial gateway system 104. For example, MERCH$$11$$ issued for the one or more client platform. The merchant key is used as a handshake to begin with. Secondly, the API key is issued for every instance of the merchant browser of the one or more client platforms. In an exemplary embodiment of the present disclosure, a customer X in California accessing the client platform will leverage "MERCH$$11$$" and will obtain a random GUID {(6B29FC40-CA47-1067-B31D-00DD010662DA} for interactions. Another customer Y, in New York accessing the merchant website will leverage the same merchant key "MERCH$$11$$" receives a random GUID {9f0b68cf-8e93-4a66-ac10-083e07f367fe} for the interactions. The content management service 508, comprises managing merchant specific content, industry specific content, common content, common content engine and the like.

The use case as a service 510 holds similar functionality to the service provider module 216. The use case as a service comprises of platform-based services comprises of prequalification, loan application, loan administration, autopay, payments, fraud, reconciliation reporting and profile management.

The cloud multi-tenant database 108, is a transactional database comprising of schema or table level separation per merchant. Additionally, The cloud multi-tenant database 108 shared schema with addition of merchant id and industry specific merchant schema.

Figure 6:
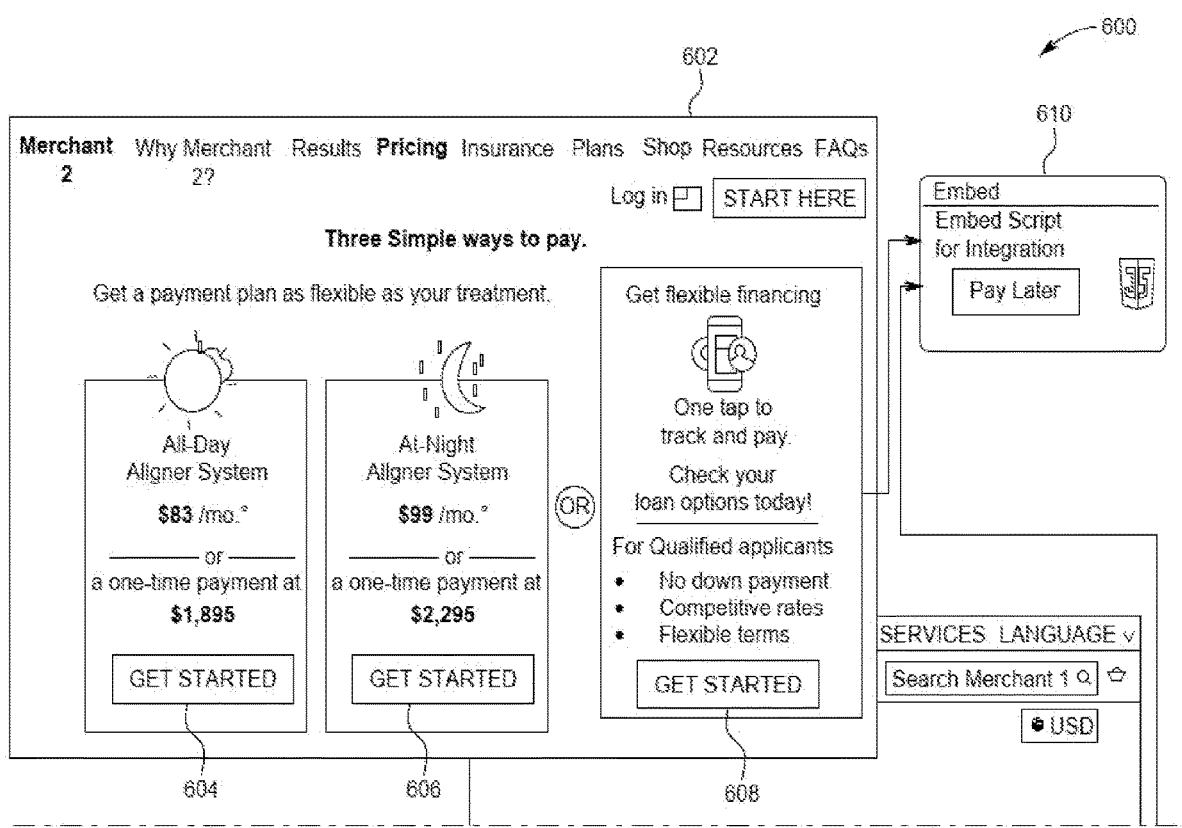
FIG. 6 is a pictorial depiction illustrating an exemplary Graphical User Interface (GUI) displaying a one or more platform-based services via the one or more client platforms, in accordance with an embodiment of the present disclosure.

FIG. 6 is a pictorial depiction illustrating an exemplary Graphical User Interface (GUI) 600 displaying a one or more platform-based services via the one or more client platforms, in accordance with an embodiment of the present disclosure. The FIG. 6 illustrates the GUI and the corresponding web integration including the webdrop sdk which enables incorporating the codes and script corresponding to the platform agnostic financial gateway system 104 into the one or more client platforms to utilize the capabilities of the platform agnostic financial gateway system 104. The functionality of the webdrop sdk submodule is explained in detail in FIG. 2. In FIG. 6, GUI screen 602 illustrates the GUI of the one or more client platforms. The sections 604, section 606 and 608 of the GUI illustrate. The embed module 610 includes similar functionality as the integration module 212. The embed module 610, integrates scripts and codes associated with the one or more client platforms to configure the one or more client platforms based on the received onboarding request. The embed module 610 comprises a webdrop JS submodule. The webdrop JS submodule is a Software Development Kit (SDK) configured to determine a browser version, a device version, and an operating system (OS) version of the one or more client platform to manage behaviors of the one or more client platforms and embed one or more software modules to configure the one or more client platforms based on the received onboarding request. Additionally, in integrating the scripts, the embed module 610 integrates the scripts and codes associated with the one or more client platforms to configure the one or more client platforms based on the received onboarding request. The embed module 610, is configured to identify a HTML tag in the one or more client platform to inject an iframe and a dynamic button into the tag identified, wherein a software language code is shared with one or more client platform developers to inject an entry point in the one or more client platforms. Moreover, the embed module 610, is further configured to configure the one or more client platform with customisation and localization requirements and exchange security keys for each of the one or more client platforms. The configuration data of the one or more client platforms comprises of a script and a code to embed the platform agnostic financial gateway system 104 entry point into backend of the one or more client platforms. 618, illustrates the details of a one or products. In the second step, the embed module 610, authenticates the one or more client platforms based on the received onboarding request. In order to authenticate the one or more client platforms, the integration module comprises of an API key generation module configured to generate, allocate and authenticate an API key to the one or more client platforms based on the received onboarding request. The API key corresponds to a unique key enabling the platform agnostic financial gateway system 104 to identify the one or more client platforms.

The embed module 610 includes co-branding of the platform agnostic financial gateway system 104 with each of the one or more client platforms. In an exemplary embodiment, each of the one or more client platforms can also be referred to as merchant 1, merchant 2, and the like. The product image 614, illustrates the one or more products viewed by the one or more customers. The image panel 612, illustrates the images stored of the one or more products. The price panel 616, illustrates the detailed price/cost description of the one or more products being viewed by the one or more customers.

Figure 7:
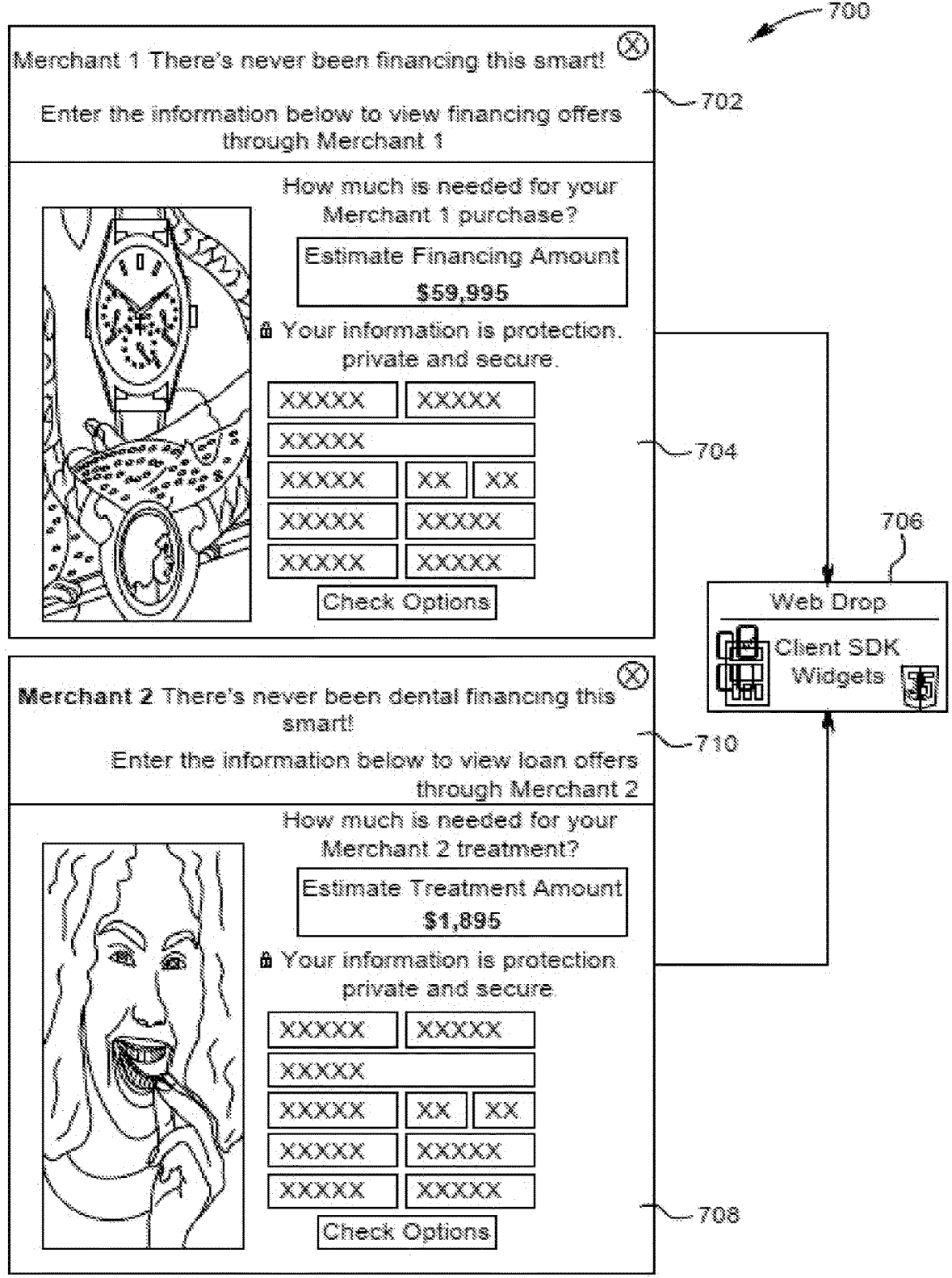
FIG. 7 is a pictorial depiction illustrating dynamic form generation configured to generate a dynamic screen workflow on the Graphical User Interface (GUI) screen of the one or more client platforms, in accordance with an embodiment of the present disclosure.

FIG. 7 is a pictorial depiction illustrating dynamic form generation 700 configured to generate a dynamic screen workflow on the Graphical User Interface (GUI) screen of the one or more client platforms, in accordance with an embodiment of the present disclosure. Section 704 and section 708 on the GUI illustrate rendering the generated dynamic screen workflow on a user interface of the one or more client platforms for enabling one or more customers to select one or more platform-based services and one or more payment options based on the identified one or more platform-based services. The GUI enables receiving a user selection of one service from among the one or more platform-based services via the one or more client platforms. The web drop 706 enables the one or more users to embed the script of the platform agnostic financial gateway system 104 into the one or more client platforms (such as, merchant 1 and merchant 2), in order to access the platform-based services offered by the platform agnostic financial gateway system 104. The exemplary financing solution 704 and financing solution 706 comprise of header component with co-branding 710. The co-branding includes the cumulatively branding of the platform agnostic financial gateway system 104 along with the branding of each of the one more client platforms (such as, merchant 1 and merchant 2).

Figure 8:
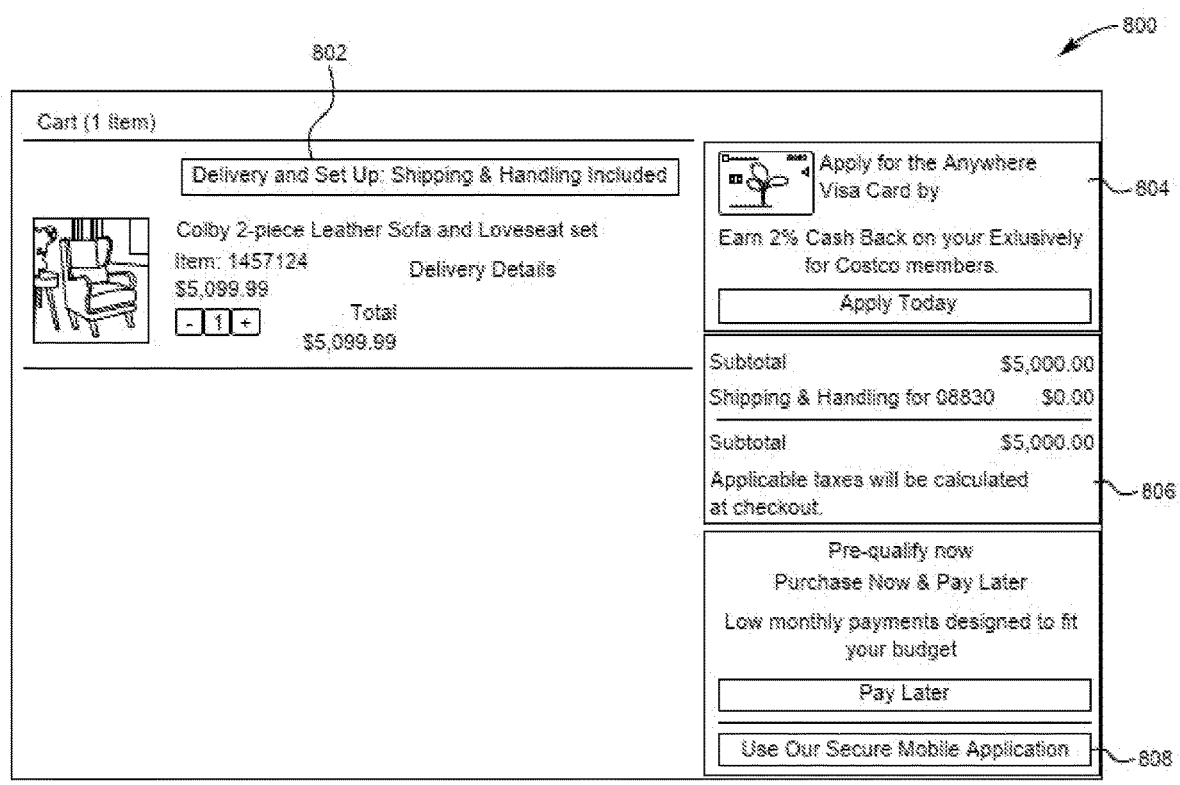
FIG. 8 is a pictorial depiction illustrating an exemplary Graphical User Interface (GUI) screen of the one or more client platforms, in accordance with an embodiment of the present disclosure.

FIG. 8 is a pictorial depiction illustrating an exemplary Graphical User Interface (GUI) screen 800 of the one or more client platforms, in accordance with an embodiment of the present disclosure. Product panel 802 illustrates the item selected along with the price details inclusive of delivery and handling charges. A financing panel 804 illustrates the other financing solutions inclusive of credit card and debit card payments. A price consolidation panel 806 illustrates the total payment to be made in order to purchase the product. A financing solution panel 808, illustrates the gateway to the platform agnostic financial gateway system 104. The one or more client platforms utilize the financing capabilities of the platform agnostic financial gateway system 104 through the pay later option in the financing solution panel 808 illustrated in FIG. 8.

Figure 9:
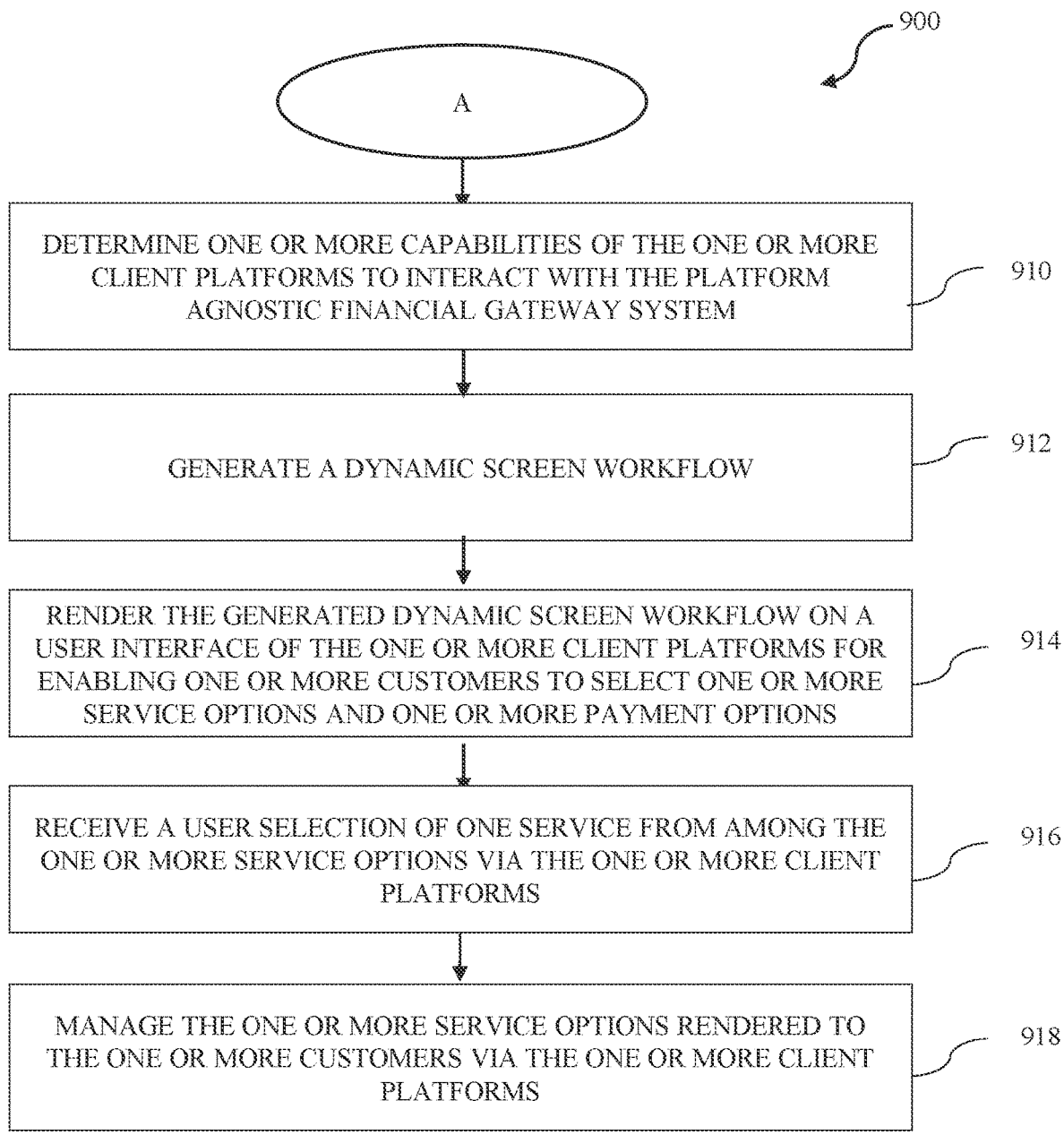
FIG. 9 is a process flow diagram illustrating an exemplary method for facilitating a platform agnostic financial gateway system and method for managing financial transactions, in accordance with an embodiment of the present disclosure.

FIG. 9 is a process flow diagram illustrating an exemplary method for facilitating a platform agnostic financial gateway method 900 for managing financial transactions, in accordance with an embodiment of the present disclosure. In an embodiment of the present disclosure, at step 902, an onboarding request sent by a one or more client platforms comprising of a one or more assets is received. The one or more client platforms corresponds to one or more product domains. The one or more assets comprise brand logo, brand icons, images, configuration of the one or more client platforms. The onboarding request comprises an application identifier, codes and scripts associated with the one or more client platforms.

At step 904, the received onboarding request is processed to integrate the one or more client platforms with the platform agnostic financial gateway system 104. In processing the received onboarding request, the following steps are executed. In the first step, scripts and codes associated with the one or more client platforms are integrated to configure the one or more client platforms based on the received onboarding request. The integration of the scripts and codes is enabled by a Software Development Kit (SDK) configured to determine a browser version, a device version, and an operating system (OS) version of the one or more client platform to manage behaviours of the one or more client platforms and embed one or more software modules to configure the one or more client platforms based on the received onboarding request. Additionally, at step 904, in order to enable integrating the scripts and codes associated with the one or more client platforms and to configure the one or more client platforms based on the received onboarding request a HTML tag is identified in the one or more client platform to inject an iframe and a dynamic button into the tag identified. Furthermore, a software language code is shared with one or more client platform developers to inject an entry point in the one or more client platforms. Moreover, at step 904, customisation and localization requirements are delivered and security keys for each of the one or more client platforms are exchanged. A configuration data of the one or more client platforms comprises of a script and a code to embed the platform agnostic financial gateway system 104 entry point into backend of the one or more client platforms.

Additionally at step 904, the one or more client platforms based on the received onboarding request are authenticated. In order to authenticate the one or more client platforms, an API Key is generated, allocated and authenticated to the one or more client platforms based on the received onboarding request. The API key corresponds to a unique key enabling the platform agnostic financial gateway system 104 to identify the one or more client platforms.

At step 906 profile data and configuration data is determined of the one or more client platforms based on the integrated scripts and codes associated with the one or more client platforms upon successful authentication of the one or more client platforms.

At step 908, one or more platform-based services are identified based on the determined profile data and configuration data of the one or more client platforms. The one or more platform—based services comprises of pre-qualification, loan application, loan administration, autopay, payments, fraud, reconciliation reporting and profile management.

At step 910, one or more capabilities of the one or more client platforms to interact with the platform agnostic financial gateway system 104 are determined based on the determined profile data, the configuration data of the one or more client platforms and the like. The one or capabilities comprise button format and styling, functions for data sharing, webhooks and event handlers. Further, the event handlers capability of the one or more client platforms is configured to determine and display live status of the selected service from the one or more platform-based services. The event handlers are configured to manage application forms filled, service offers provided, service offers selected, pre-approved financing and the like. Furthermore, in determining the one or more capabilities of the one or more client platforms to interact with the platform agnostic financial gateway system 104 based on the determined profile data, the configuration data of the one or more client platforms, the following steps are executed. In the first step, the determined profile data, the configuration data of the one or more client platforms is applied onto a trained artificial intelligence-based service capability model. In the second step, one or more capabilities are determined of the one or more client platforms to interact with the platform agnostic financial gateway system 104 based on the output of the trained artificial intelligence-based service capability model.

At step 912, dynamic screen workflow is generated based on the one or more assets, identified one or more platform-based services, the determined one or more capabilities of the one or more client platforms, the determined profile data, and the configuration data of the one or more client platforms.

At step 914, a generated dynamic screen workflow is rendered on a graphical user interface of the one or more client platforms for enabling one or more customers to select one or more platform-based services and one or more payment options based on the identified one or more platform-based services.

At step 916, a user selection of one service is received from among the one or more platform-based services via the one or more client platforms.

At step 918, the one or more platform-based services are managed and rendered to the one or more customers via the one or more client platforms. In managing the one or more platform-based services rendered to the one or more customers via the one or more client platforms, the following steps are executed. In the first step, the one or more customers are routed based on the rendered dynamic screen workflow to a mobile application for completing an application process of a selected service. In the second step, one or more phases of the selected service are displayed on the GUI of the one or more customers. In the third step, a one or more exceptions are displayed on the graphical user interface screen of one or more mobile devices. The one or more exceptions comprise duplicate transactions, missing transactions, transactions posted to a wrong account, accounting errors, timing differences, and lender errors. The one or more exceptions are outputted in one or more output formats for allowing one or more operators to handle the one or more exceptions and one or more aged reconciliation issues. The one or more output formats comprise native excel sheets with transaction data, Portable Document Formats (PDFs), dashboards and reports. In the third step, the selected service is dynamically tracked on the one or more client platforms by periodically obtaining event status message from the one or more client website via an event listener module. The service management module 220, is further configured to generate one or more service summary reports based on event status message, one or more exceptions and generate one or more recommendation messages for handling the one or more services based on pre-stored solution table.

The AI-based method used by the platform agnostic financial gateway system 104 may be implemented in any suitable hardware, software, firmware, or combination thereof.

Thus, various embodiments of the present system provide a solution to facilitate a financing gateway in financial transaction son client platforms. The platform agnostic financial gateway system 104 provides a set of adapters for all possible integrations including HTTP, FTP, STFP, s3, DB and even dynamic scripts. In an embodiment of the present disclosure, adding source is only a configuration and no code is required. In an embodiment of the present disclosure, the platform agnostic financial gateway system 104 has the ability to convert this engine as a service and handle financial solutions to the one or more client organizations. The platform agnostic financial gateway system 104 provides full services loan application and administration capabilities in the mobile devices natively. In an embodiment of the present disclosure, the financial gateway computing system 104 corresponds to Platform as a Service (PaaS). Furthermore, the financial gateway computing system 104 includes several autonomous modules, such as pre-approval, auto-pay setup, reconciliation, identity validations, and the like, that can be offered as individual services in the platform. The computing system 104, improves and transforms credit lending, and allows instant integration of the one or more client platforms to the platform agnostic financial gateway system 104. Furthermore, the computing system 104 simplifies the purchasing process of the one or more customers/end borrowers', making the purchasing process easier by delivering financing solutions inclusive of completion of the loan application process and loan approval process in less time.

The platform agnostic financial gateway system 104, comprises of a data driven and a customizable workflow, customizable and data driven rules that direct the workflow, and a customizable user experience. The platform agnostic financial gateway system 104, is proficient to process the onboarding procedure of multiple one or more client platforms in parallel in less time (e.g., within a few hours or a few days). The platform agnostic financial gateway system 104, is further customizable for numerous E-commerce domains, such as, but are not limited to, health care, home improvement, hospitality, fashion, electronics, furniture, beauty and personal care, household, and the like. For example, platform agnostic financial gateway system 104 used for home improvement e-commerce domain may be dynamically and instantly customized and configured to health care domain, by modifying the workflow and rules corresponding to the health care domain.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, and the like. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 308 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. An Artificial Intelligence-based (AI-based) platform agnostic, customizable financial gateway system for managing financial transactions on client platforms, the platform agnostic financial gateway system comprising:
one or more hardware processors; and
a memory coupled to the one or more hardware processors, wherein the memory comprises a plurality of modules in the form of programmable instructions executable by the one or more hardware processors, and wherein the plurality of modules comprises:
an input receiver module configured to receive onboarding request by one or more client platforms comprising of one or more assets, unique to the one or more client platforms, wherein the one or more client platforms corresponds to one or more product domains, wherein the one or more assets comprise brand logo, brand icons, images, configuration of the one or more client platforms and wherein the onboarding request comprises an application identifier, codes and scripts associated with the one or more client platforms;
an integration module configured to process the received onboarding request to integrate the one or more client platforms with the platform agnostic financial gateway system, wherein in processing the received onboarding request, the integration module is configured to:
integrate scripts and codes associated with the one or more client platforms to configure the one or more client platforms based on the received onboarding request; and
authenticate the one or more client platforms based on the received onboarding request;
a content management module configured to determine profile data and configuration data of the one or more client platforms based on the integrated scripts and codes associated with the one or more client platforms upon successful authentication of the one or more client platforms;
a service provider module configured to:
identify one or more platform-based services based on the determined profile data and configuration data of the one or more client platforms, wherein the one or more platform-based services comprises of pre-qualification, loan application, loan administration, autopay, payments, fraud, reconciliation reporting and profile management; and
determine one or more capabilities of the one or more client platforms to interact with the platform agnostic financial gateway system based on the determined profile data and the configuration data of the one or more client platforms, wherein in determining one or more capabilities of the one or more client platforms the service provider module configured to:
apply the determined profile data, the configuration data of the one or more client platforms onto a trained artificial intelligence-based service capability model, and
determine one or more capabilities of the one or more client platforms to interact with the platform agnostic financial gateway system based on the output of the trained artificial intelligence-based service capability model;
a dynamic form generation module configured to generate a dynamic screen workflow based on the one or more assets unique to the one or more client platforms, identified one or more platform-based services, the determined one or more capabilities of the one or more client platforms, the determined profile data, and the configuration data of the one or more client platforms, wherein the dynamic screen workflows are generated dynamically using templates, and wherein the templates are defined by each of the one or more client platforms to configure client specific form schema and branding style rules for the one or more client platforms;
a service management module configured to:
render the generated dynamic screen workflow on a user interface of the one or more client platforms for enabling one or more customers to select one or more platform-based services and one or more payment options based on the identified one or more platform-based services;
receive a user selection of one service from among the one or more platform-based services via the one or more client platforms, and
manage the one or more platform-based services rendered to the one or more customers via the one or more client platforms.

2. The AI-based platform agnostic, customizable financial gateway system of claim 1, wherein in managing the one or more platform-based services rendered to the one or more customers via the one or more client platforms, the service management module is configured to:
route the one or more customers based on the rendered dynamic screen workflow to a mobile application for completing an application process of a selected service;
display one or more phases of the selected service;
display one or more exceptions on the graphical user interface screen of one or more mobile devices, wherein the one or more exceptions are outputted in one or more output formats for allowing one or more operators to handle the one or more exceptions and one or more aged reconciliation issues, and wherein the one or more output formats comprise native excel sheets with transaction data, Portable Document Formats (PDFs), dashboards and reports; and
dynamically tracking the selected service on the one or more client platforms by periodically obtaining event status message from the one or more client website via an event listener module.

3. The AI-based platform agnostic, customizable financial gateway system of claim 1, wherein the integration module comprises a webdrop JS submodule, and wherein the webdrop JS submodule is a Software Development Kit (SDK) configured to:
determine a browser version, a device version, and an operating system (OS) version of the one or more client platforms to manage behaviors of the one or more client platforms and embed one or more software modules to configure the one or more client platforms based on the received onboarding request.

4. The AI-based platform agnostic, customizable financial gateway system of claim 1, further comprising an API key generation module configured to generate, allocate and authenticate an API key to the one or more client platforms based on the received onboarding request, wherein the API key corresponds to a unique key enabling the platform agnostic financial gateway system to identify the one or more client platforms.

5. The AI-based platform agnostic, customizable financial gateway system of claim 1, wherein the capabilities comprise button format and styling, functions for data sharing, webhooks and event handlers.

6. The AI-based platform agnostic, customizable financial gateway system of claim 5, wherein the event handlers capability of the one or more client platforms is configured to determine and display live status of the selected service, wherein the event handlers are configured to manage application forms filled, service offers provided, service offers selected, and pre-approved financing.

7. The AI-based platform agnostic, customizable financial gateway system of claim 1, wherein the platform agnostic financial gateway system is a Business to Business to Customer (B2B2C) workflow system for the one or more customers.

8. The AI-based platform agnostic, customizable financial gateway system of claim 2, wherein the one or more exceptions comprise duplicate transactions, missing transactions, transactions posted to a wrong account, accounting errors, timing differences, and lender errors.

9. The AI-based platform agnostic, customizable financial gateway system of claim 1, wherein the service management module is configured to:
   generate one or more service summary reports based on event status message, one or more exceptions; and
   generate one or more recommendation messages for handling the one or more services based on pre-stored solution table.

10. The AI-based platform agnostic, customizable financial gateway system of claim 1, wherein in integrating the scripts and codes associated with the one or more client platforms to configure the one or more client platforms based on the received onboarding request, the integration module is configured to identify a HTML tag in the one or more client platform to inject an iframe and a dynamic button into the tag identified, wherein a software language code is shared with one or more client platform developers to inject an entry point in the one or more client platforms.

11. The AI-based platform agnostic, customizable financial gateway system of claim 1, wherein the integration module is further configured to:
   configure the one or more client platform with customisation and localization requirements and exchange security keys for each of the one or more client platforms, wherein the configuration data of the one or more client platforms comprises of a script and a code to embed the platform agnostic financial gateway system entry point into backend of the one or more client platforms.

12. An Artificial Intelligence-based (AI-based) platform agnostic, customizable financial gateway method for managing financial transactions on client platforms, the platform agnostic financial gateway method comprising:
   receiving, by one or more hardware processors, an onboarding request by one or more client platforms comprising of one or more assets, unique to the one or more client platforms, wherein the one or more client platforms corresponds to one or more product domains, wherein the one or more assets comprise brand logo, brand icons, images, configuration of the one or more client platforms and wherein the onboarding request comprises an application identifier, codes and scripts associated with the one or more client platforms;
   processing, by the one or more hardware processors, the received onboarding request to integrate the one or more client platforms with the platform agnostic financial gateway system;
   integrating, by the one or more hardware processors, scripts and codes associated with the one or more client platforms to configure the one or more client platforms based on the received onboarding request;
   authenticating, by the one or more hardware processors, the one or more client platforms based on the received onboarding request;
   determining, by the one or more hardware processors, profile data and configuration data of the one or more client platforms based on the integrated scripts and codes associated with the one or more client platforms upon successful authentication of the one or more client platforms;
   identifying, by the one or more hardware processors, one or more platform-based services based on the determined profile data and configuration data of the one or more client platforms, wherein the one or more platform-based services comprises of pre-qualification, loan application, loan administration, autopay, payments, fraud, reconciliation reporting and profile management;
   determining, by the one or more hardware processors, one or more capabilities of the one or more client platforms to interact with the platform agnostic financial gateway system based on the determined profile data, the configuration data of the one or more client platforms, wherein determining one or more capabilities of the one or more client platforms to interact with the platform agnostic financial gateway method, the platform agnostic financial gateway method comprises:
      applying the determined profile data, the configuration data of the one or more client platforms onto a trained artificial intelligence-based service capability model, and
      determining one or more capabilities of the one or more client platforms to interact with the platform agnostic financial gateway system based on the output of the trained artificial intelligence-based service capability model;
   generating, by the one or more hardware processors, a dynamic screen workflow based on the one or more assets unique to the one or more client platforms, identified one or more platform-based services, the determined one or more capabilities of the one or more client platforms, the determined profile data, and the configuration data of the one or more client platforms, wherein the dynamic screen workflows are generated dynamically using templates, and wherein the templates are defined by each of the one or more client platforms to configure client specific form schema and branding style rules for the one or more client platforms;
   rendering, by the one or more hardware processors, the generated dynamic screen workflow on a user interface of the one or more client platforms for enabling one or more customers to select one or more platform-based services and one or more payment options based on the identified one or more platform-based services;
   receiving, by the one or more hardware processors, user selection of one service from among the one or more platform-based services via the one or more client platforms; and managing, by the one or more hardware processors, the one or more platform-based services rendered to the one or more customers via the one or more client platforms.

13. The AI-based method of claim 12, wherein managing the one or more platform-based services rendered to the one or more customers via the one or more client platforms further comprises:
routing the one or more customers based on the rendered dynamic screen workflow to a mobile application for completing an application process of a selected service;
displaying one or more phases of the selected service;
displaying one or more exceptions on the graphical user interface screen of one or more mobile devices, wherein the one or more exceptions are outputted in one or more output formats for allowing one or more operators to handle the one or more exceptions and one or more aged reconciliation issues, and wherein the one or more output formats comprise native excel sheets with transaction data, Portable Document Formats (PDFs), dashboards and reports; and
dynamically tracking the selected service on the one or more client platforms by periodically obtaining event status message from the one or more client website via an event listener module.

14. The AI-based method of claim 12, wherein in processing the received onboarding request and the integrating codes and scripts a Software Development Kit (SDK) comprises:
determining a browser version, a device version, and an operating system (OS) version of the one or more client platform to manage behaviors of the one or more client platforms and embed one or more software modules to configure the one or more client platforms based on the received onboarding request.

15. The AI-based method of claim 12, wherein the platform agnostic financial gateway method generates, allocates and authenticates an API key to the one or more client platforms based on the received onboarding request, wherein the API key corresponds to a unique key enabling the platform agnostic financial gateway system to identify the one or more client platforms.

16. The AI-based method of claim 12, wherein the capabilities comprise button format and styling, functions for data sharing, webhooks and event handlers.

17. The AI-based method of claim 16, wherein the event handlers capability of the one or more client platforms is configured to determine and display live status of the selected service, wherein the event handlers are configured to manage application forms filled, service offers provided, service offers selected, and pre-approved financing.

18. The AI-based method of claim 12, wherein the platform agnostic financial gateway method is a Business to Business to Customer (B2B2C) workflow system for the one or more customers.

19. The AI-based method of claim 12, wherein the one or more exceptions comprise duplicate transactions, missing transactions, transactions posted to a wrong account, accounting errors, timing differences, and lender errors.

20. The AI-based method of claim 12, wherein managing the platform agnostic financial gateway method comprises:
generating one or more service summary reports based on event status message, one or more exceptions; and
generating one or more recommendation messages for handling the one or more services based on pre-stored solution table.

21. The AI-based method of claim 12, wherein in integrating the scripts and codes associated with the one or more client platforms to configure the one or more client platforms based on the received onboarding request, the integration module is configured to identify a HTML tag in the one or more client platform to inject an iframe and a dynamic button into the tag identified, wherein a software language code is shared with one or more client platform developers to inject an entry point in the one or more client platforms.

22. The AI-based method of claim 12, wherein in order to integrate scripts and codes the platform agnostic financial gateway method comprises:
configuring the one or more client platform with customisation and localization requirements and exchange security keys for each of the one or more client platforms, wherein the configuration data of the one or more client platforms comprises of a script and a code to embed the platform agnostic financial gateway system entry point into backend of the one or more client platforms.

* * * * *